(12) United States Patent
Koeppen et al.

(10) Patent No.: US 7,864,423 B2
(45) Date of Patent: Jan. 4, 2011

(54) SPECTRALLY ADJUSTABLE FILTER

(75) Inventors: Christopher S. Koeppen, New Hope, PA (US); Steven E. Parks, Mertztown, PA (US)

(73) Assignee: Aegis Lightwave, Inc., Woburn, MA (US)

( * ) Notice: Subject to any disclaimer, the term of this patent is extended or adjusted under 35 U.S.C. 154(b) by 740 days.

(21) Appl. No.: 11/837,385

(22) Filed: Aug. 10, 2007

(65) Prior Publication Data

US 2009/0040615 A1 Feb. 12, 2009

(51) Int. Cl.
*G02B 27/44* (2006.01)

(52) U.S. Cl. ............... 359/566; 359/337.21; 385/37; 398/87; 398/88

(58) Field of Classification Search ............... None
See application file for complete search history.

(56) References Cited

U.S. PATENT DOCUMENTS

| | | | |
|---|---|---|---|
| 5,960,133 | A | 9/1999 | Tomlinson |
| 6,097,859 | A | 8/2000 | Solgaard et al. |
| 6,204,946 | B1 | 3/2001 | Aksyuk et al. |
| 6,801,551 | B1 | 10/2004 | Delfyett et al. |
| 6,891,676 | B2 | 5/2005 | Ford et al. |
| 6,983,090 | B2 | 1/2006 | Weber et al. |
| 7,002,697 | B2 | 2/2006 | Domash et al. |
| 7,253,897 | B2 | 8/2007 | Moon et al. |
| 7,257,288 | B1 | 8/2007 | Strasser et al. |
| 7,408,639 | B1 | 8/2008 | Strasser et al. |
| 7,605,976 | B1 | 10/2009 | Wolleschensky et al. |
| 2003/0215182 | A1* | 11/2003 | Lin et al. ............ 385/37 |
| 2004/0136074 | A1 | 7/2004 | Ford et al. |
| 2007/0041683 | A1 | 2/2007 | Keyworth |
| 2008/0085119 | A1 | 4/2008 | Ye et al. |
| 2008/0273560 | A1 | 11/2008 | Stelmakh |
| 2009/0067054 | A1* | 3/2009 | Koeppen et al. ......... 359/615 |

OTHER PUBLICATIONS

Cahill, Michael; Bartolini, Glenn, "Distribution of Embedded DWDM Channel Monitors in Pass-Through Node Limited Transmission Links," Optical Fiber Communication and the National Fiber Optic Engineers Conference; Volume , Issue , Mar. 25-29, 2007 pp. 1-4.
G. D. Bartolini, "Low-cost optical monitoring for DWDM systems," Proc. OSA Topical Meeting on Optical Amplifiers, OWB1 (2004).
Bayspec product sheet downloaded from http://www.bayspec.com/pdf/OCPM.pdf on Aug. 6, 2007.
JDSU product sheet downloaded from http://products.jdsu.com/assets/public/pdf/wbcb_ds_cms_ae_020806.pdf on Aug. 6, 2007.

* cited by examiner

*Primary Examiner*—Arnel C Lavarias
(74) *Attorney, Agent, or Firm*—Fish & Richardson P.C.

(57) ABSTRACT

Spectrally filtering at least one input beam includes: dispersing spectral components of at least one input beam at respective angles in a spectral plane; changing at least some of the angles of the propagation axes of the dispersed spectral components so that a plurality of the spectral components reflect from a single reflective surface; and tilting the reflective surface to select at least one and fewer than all of the received spectral components to be directed to an output spatial mode.

24 Claims, 20 Drawing Sheets

SPECTRALLY ADJUSTABLE FILTER

BACKGROUND

This description relates to spectrally adjustable filtering.

Devices that spectrally filter and/or detect light can be used in optical communication systems, such as wavelength division multiplexed (WDM) systems, for adjustable filtering and attenuation of spectral components (or "wavelengths" or "channels") that are multiplexed together in the WDM spectrum. Such devices can be used for optical detection and monitoring of spectral components in the WDM spectrum. Typically, each spectral component has a nominal wavelength corresponding to the center frequency of a channel. In some systems, each spectral component has a spectral shape with a central lobe that has a narrow enough linewidth such that adjacent spectral components, whose center frequencies are separated by a given channel spacing, do not overlap significantly. In some systems, spectral components comprise respective sub-bands of wavelengths over a continuous spectrum that does not necessarily have any separation between adjacent spectral components. It is understood that the term "spectral component" as used herein should be construed broadly, and encompasses these various examples.

Wavelength filtering devices are typically classified as fixed or adjustable. Fixed devices filter a predetermined spectral band while adjustable filters allow reconfiguration of the wavelengths being filtered. Adjustable filtering devices provide the ability to dynamically update system configuration to optimize parameters such as transmission performance and bandwidth utilization. Adjustable filters also enable system operators to provision (turn up) new wavelengths and services.

Optical spectrum monitoring devices can be used within a WDM system to monitor system performance by measuring one or more optical signal attributes including wavelength, optical power, optical signal-to-noise ratio (OSNR), spectral shape, bit-rate, and polarization state, among others. The information provided by optical spectrum monitors may be utilized for system health reporting, fault location and analysis, feedback control and system optimization, and for other purposes.

SUMMARY

In one aspect, in general, an apparatus for spectrally filtering at least one input beam includes a spectrally dispersive element configured to disperse spectral components of at least one input beam at respective angles in a spectral plane; one or more optical elements configured to change at least some of the angles of the propagation axes of the dispersed spectral components; and a reflective surface configured to receive a plurality of the dispersed spectral components, and to tilt to select at least one and fewer than all of the received spectral components to be directed to an output spatial mode.

Aspects can include one or more of the following features.

Directing a selected spectral component to the output spatial mode comprises directing the selected spectral component back to the spectrally dispersive element along substantially the same angle in the spectral plane at which the selected spectral component was dispersed.

The one or more optical elements are configured to direct the dispersed spectral components from a given input beam to the reflective surface at different respective angles of incidence.

The one or more optical elements are configured to direct the dispersed spectral components from a given input beam to the reflective surface such that the propagation axes of the spectral components from the given input beam are converging.

The one or more optical elements are configured such that the transverse spatial extent of the input beam on the spectrally dispersive element is larger than the transverse spatial extent of the dispersed spectral components on the reflective surface.

The transverse spatial extent of the input beam on the spectrally dispersive element is at least about two times larger than the transverse spatial extent of the dispersed spectral components on the reflective surface.

The reflective surface is configured to reflect at least one and fewer than all of the received spectral components back to the spectrally dispersive element to be directed to the output spatial mode.

The reflective surface is configured to retroreflect at least one and fewer than all of the received spectral components back to the spectrally dispersive element.

The reflective surface is configured to direct the received spectral components to a reflector that reflects at least one and fewer than all of the received spectral components back to the reflective surface and back to the spectrally dispersive element to be directed to the output spatial mode.

A tilt angle of the reflective surface determines which of the received spectral components is incident on the reflector.

The reflective surface is configured to tilt to select at least one and fewer than all of the received spectral components to be directed to an output spatial mode that matches a spatial mode of a corresponding input beam.

The apparatus further comprises a first multiport optical element configured to couple light received at a first port to a second port to provide a first input beam to the spectrally dispersive element, and to couple light received at the second port in the spatial mode of the first input beam to a third port.

The apparatus further comprises a second multiport optical element configured to couple light received at a first port to a second port to provide a second input beam to the spectrally dispersive element, and to couple light received at the second port in the spatial mode of the second input beam to a third port.

The first and second multiport optical elements are configured to provide the first and second input beams, respectively, to different locations of the spectrally dispersive element.

The first and second multiport optical elements are configured to provide the first and second input beams, respectively, to the spectrally dispersive element at different angles in the spectral plane.

The first multiport optical element comprises a waveguide coupler.

The first multiport optical element comprises a circulator.

The apparatus further comprises a detector configured to receive light from the third port and provide an electrical signal proportional to the intensity of the received light.

The apparatus further comprises at least one detector configured to receive at least a portion of a spectral component that has been directed back to the spectrally dispersive element, and to provide an electrical signal proportional to the intensity of the received portion.

The reflective surface is configured to receive dispersed spectral components from multiple input beams, and to tilt to select at least one and fewer than all of the received spectral components of a given input beam to be directed to a corresponding output spatial mode.

The spectrally dispersive element comprises a reflective diffraction grating.

The spectrally dispersive element comprises a transmissive diffraction grating.

The spectrally dispersive element is fixed relative to a port that provides an input beam to the spectrally dispersive element.

The one or more optical elements comprise one or more lenses.

At least one of the lenses is an aspherical lens.

At least one of the lenses is a cylindrical lens.

The apparatus further comprises one or more optical elements configured to expand the input beam provided to the spectrally dispersive element.

The one or more optical elements configured to expand the input beam comprise at least one prism.

The apparatus further comprises a quarter waveplate between the spectrally dispersive element and the reflective surface.

The reflective surface is configured to tilt in response to a control signal.

The one or more optical elements are further configured to limit the total angular dispersion of the dispersed spectral components to be less than a tilt range of the reflective surface.

The one or more optical elements are configured to limit the total angular dispersion of the dispersed spectral components to about 80% of the tilt range of the reflective surface.

The apparatus further comprises a controller configured to provide a control signal to scan a tilt angle of the reflective surface to sequentially direct spectral components that have been dispersed at different angles back to the spectrally dispersive element.

The apparatus further comprises at least one detector configured to receive at least a portion of a spectral component that has been directed back to the spectrally dispersive element, and to provide an electrical signal proportional to the intensity of the received portion.

A first detector detects spectral components from a first input beam that has a known spectrum to provide a wavelength calibration reference.

A second detector detects spectral components of a second input beam to measure a spectrum of the second input beam that is calibrated according to the wavelength calibration reference.

A single scan of the tilt angle of the reference surface provides both the wavelength calibration reference and the measured spectrum of the second input beam.

The apparatus further comprises a splitter to direct a first portion of a spectral component to a slow-speed detector that measures one or more of wavelength, optical power, and optical signal-to-noise ratio, and to direct a second portion of the spectral component to a high-speed detector that measures one or more of bit rate, bit-error rate, and Q.

The apparatus further comprises a polarizer between the spectrally dispersive element and the detector.

In another aspect, in general, a method for spectrally filtering at least one input beam includes dispersing spectral components of at least one input beam at respective angles in a spectral plane; changing at least some of the angles of the propagation axes of the dispersed spectral components so that a plurality of the spectral components reflect from a single reflective surface; and tilting the reflective surface to select at least one and fewer than all of the received spectral components to be directed to an output spatial mode.

Aspects can include one or more of the following features.

Directing a selected spectral component to the output spatial mode comprises directing the selected spectral component back to the spectrally dispersive element along substantially the same angle in the spectral plane at which the selected spectral component was dispersed.

The method further comprises directing the dispersed spectral components from a given input beam to the reflective surface at different respective angles of incidence.

Directing the dispersed spectral components from a given input beam to the reflective surface comprises directing the dispersed spectral components from a given input beam to the reflective surface such that the propagation axes of the spectral components from the given input beam are converging.

Changing at least some of the angles of the propagation axes of the dispersed spectral components comprises changing the angles such that the transverse spatial extent of the input beam on the spectrally dispersive element is larger than the transverse spatial extent of the dispersed spectral components on the reflective surface.

The transverse spatial extent of the input beam on the spectrally dispersive element is at least about two times larger than the transverse spatial extent of the dispersed spectral components on the reflective surface.

Tilting the reflective surface to select at least one and fewer than all of the received spectral components to be directed to an output spatial mode comprises reflecting at least one and fewer than all of the received spectral components from the reflective surface back to the spectrally dispersive element to be directed to the output spatial mode.

Reflecting at least one and fewer than all of the received spectral components from the reflective surface back to the spectrally dispersive element comprises retroreflecting at least one and fewer than all of the received spectral components from the reflective surface back to the spectrally dispersive element.

Tilting the reflective surface to select at least one and fewer than all of the received spectral components to be directed to an output spatial mode comprises directing the received spectral components to a reflector that reflects at least one and fewer than all of the received spectral components back to the reflective surface and back to the spectrally dispersive element to be directed to the output spatial mode.

A tilt angle of the reflective surface determines which of the received spectral components is incident on the reflector.

Tilting the reflective surface to select at least one and fewer than all of the received spectral components to be directed to an output spatial mode comprises tilting to select at least one and fewer than all of the received spectral components to be directed to an output spatial mode that matches a spatial mode of a corresponding input beam.

Aspects can have one or more of the following advantages. It is understood that the following advantages are exemplary, and should not be construed as limitations on the invention. Certain advantages may or may not be present in any specific implementation.

A single tuning element may be used to receive multiple of the spectrally dispersed spectral components (or in some cases all or substantially all of the dispersed spectral components) onto the same reflective surface and select one of the received components (i.e., the components incident on a surface of the tuning element) by angle tuning. Filters using a single tuning element may be more cost effective than filters that use multiple tuning elements for respective beams of different spectral components, for example. Additionally, a single reflective surface may enable a large portion of a transverse spatial profile of each beam to be reflected without clipping (e.g., at the tails of a Gaussian profile), which could otherwise result in loss. The angle tuning of the dispersed spectral components may provide a higher spectral resolution and accuracy than other forms of tuning such as Fabry Perot filters. Precise control, stability, or uniformity of the filtering characteristics may be achieved without necessarily using costly techniques such as feedback mechanisms or precision mechanical components.

There are a number of device-level attributes and considerations that may affect spectral resolution and accuracy, cost, size, and reliability toward enabling more universally optimized spectrally adjustable filters and optical spectrum monitors. These attributes listed herein are exemplary, and should not be construed as limitations on the invention. One exemplary attribute for enhanced spectral resolution and accuracy for implementations that use a grating as a spectrally dispersive element is having a large and well-controlled input beam on the grating. Illuminating more grating rulings, as is accomplished with larger beams, generally increases spectral resolution. Further, a well-controlled input beam on the grating, for example, a beam that is always incident at the same location and at the same angle (e.g., in a configuration in which the grating does not need to be tilted for tuning), may provide improved stability and accuracy as spectral properties of the grating can vary at different positions on the grating. Since a large beam at a grating can result in a large spatial extent of the dispersed spectral components, one or more optical elements that change the angles of the dispersed spectral components before they reach the tuning element, may reduce the transverse spatial extent of the spectral components and enable a compact device that uses a smaller more stable tuning element.

Other features and advantages of the invention will become apparent from the following description, and from the claims.

DESCRIPTION

1 Overview

Figure 1A:
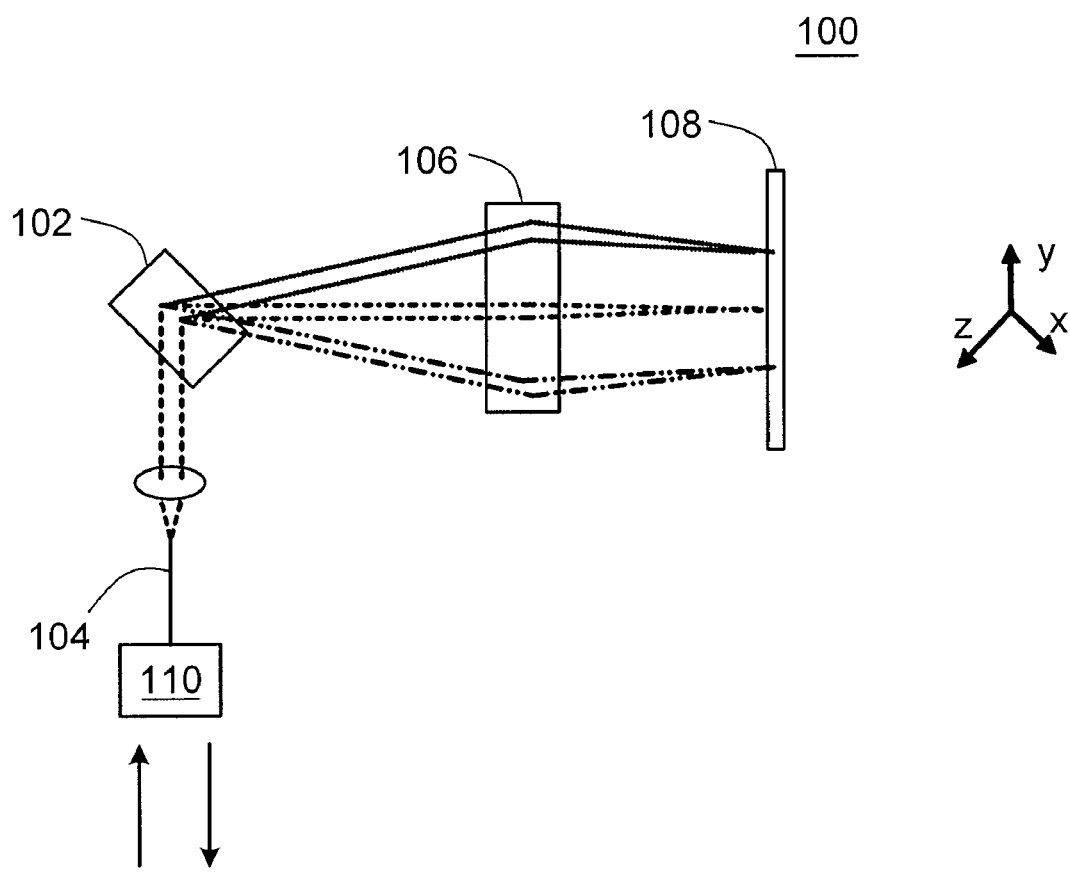
FIG. 1A is a configuration of an exemplary spectrally adjustable filter (spectral plane view).
Figure 1B:
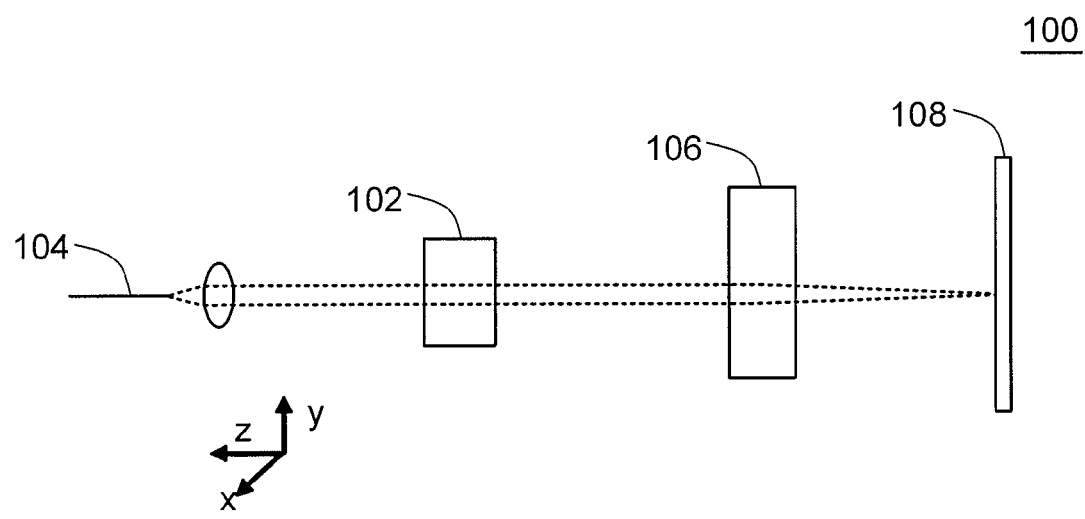
FIG. 1B is a configuration of an exemplary spectrally adjustable filter (perpendicular to spectral plane view).

Referring to FIGS. 1A and 1B, an exemplary spectrally adjustable filter device 100 includes a spectrally dispersive element 102 that receives an input beam having multiple spectral components propagating together along a common propagation axis from an input spatial mode. In this example, the input spatial mode is defined by a waveguide 104 (e.g., an optical fiber). The spectrally dispersive element 102 angularly disperses different wavelengths. Thus, the spectral components, having different peak wavelengths, are dispersed such that the angles of their respective propagation axes are different. The angles of the spectral components are dispersed within a plane, called the "spectral plane," which is the x-z plane in FIGS. 1A and 1B. This angular dispersion produces spatial dispersion as the spectral components propagate away from the element 102. FIG. 1A shows a view of the spectral components being dispersed in the spectral plane. FIG. 1B shows a view of the spectral components in a plane perpendicular to the spectral plane (the y-z plane). As shown in FIG. 1B, the projections of the different spectral components onto the y-z plane overlap.

In the illustrated example, the device 100 includes "conversion optics" 106 that include one or more optical elements configured to change some of the angles of the propagation axes of the dispersed spectral components so that a plurality of the dispersed spectral components are gathered close enough to reflect from a single reflective surface of a reflector 108. In the illustrated example, all or substantially all of the spectral components are received by (i.e., incident on) the reflective surface. In other examples, a smaller subset of the dispersed spectral components from a given input beam (e.g., half of the dispersed spectral components, as for the enhanced resolution optical spectrum monitor described below) may be received by the reflective surface. The reflector 108 is preferably configured to tilt (e.g., on a rotation stage) about the axis perpendicular to the spectral plane. This axis may be referred to herein as the y-axis, although it is understood that any nomenclature for such axis or other axis is for convenience and clarity only, and should not be construed as a limitation on the invention.

Since the spectral components generally arrive at the surface of the reflector 108 at different angles of incidence (converging in this example), tilting the reflector 108 selects one of the dispersed spectral components to be directed to an output spatial mode. A given angle corresponds to a specific spectral component that is to be directed to the output spatial mode. In the device 100, the output spatial mode is the same as the input spatial mode defined by the waveguide 104 (where a "spatial mode" refers to the transverse spatial profile of a beam and not its direction of propagation). So in this configuration, the selected spectral component is retro-reflected back to the spectrally dispersive element along substantially the same angle in both the spectral plane and the orthogonal y-z plane at which the selected spectral component was dispersed. A coupler 110 may be used to couple the input beam into the waveguide 104, and to couple the selected output spectral component from the waveguide 104. In many spectrally adjustable filter applications, low insertion loss is an important optical performance parameter. Accordingly, the coupler 110 could be replaced by a circulator, for example, to provide lower insertion loss.

Figure 2A:
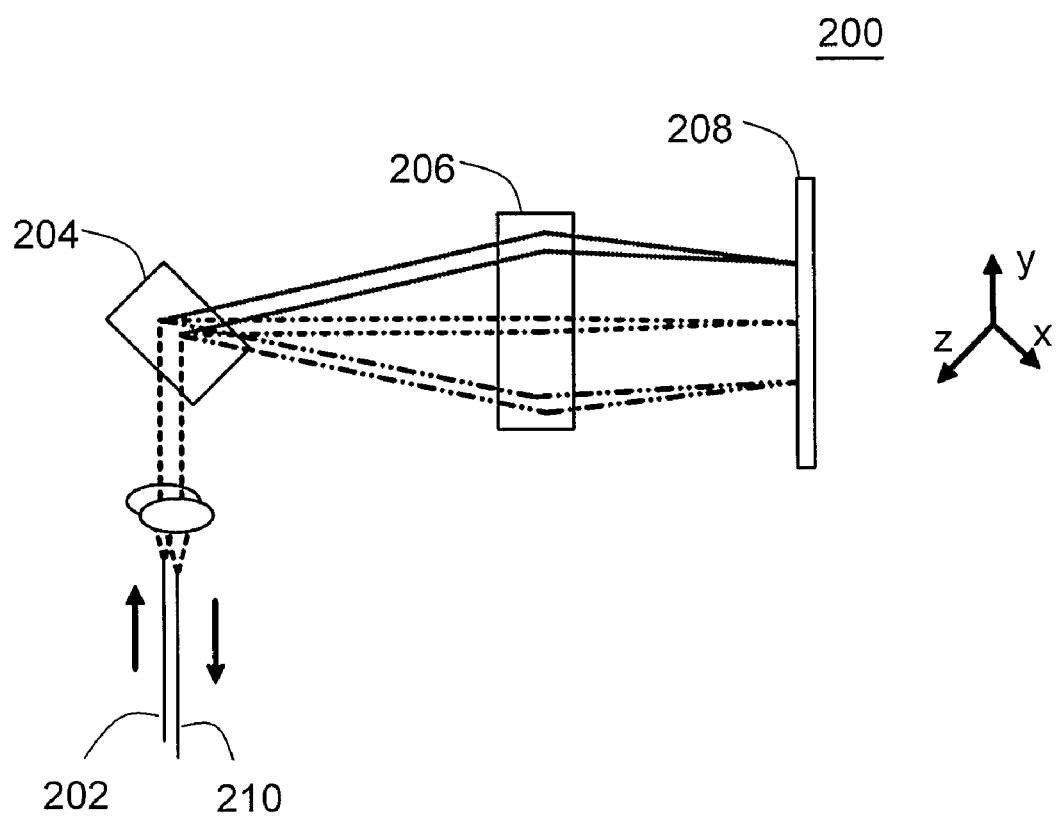
FIG. 2A is a configuration of an exemplary spectrally adjustable filter with different input and output paths (spectral plane view).
Figure 2B:
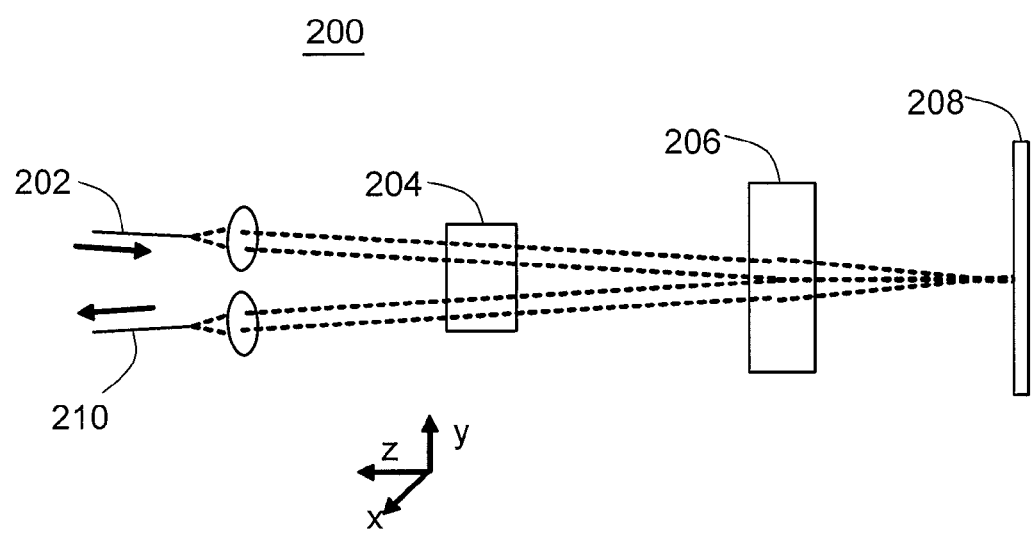
FIG. 2B is a configuration of an exemplary spectrally adjustable filter with different input and output paths (perpendicular to spectral plane view).

FIGS. 2A and 2B show another configuration that further reduces insertion loss, which may eliminate the need for a coupler or circulator by using different input and output paths. FIG. 2A shows a device 200 in the spectral plane (x-z plane) view. An input waveguide 202 provides an input beam that is dispersed by a spectrally dispersive element 204. Conversion optics 206 gathers the dispersed spectral components to reflect from a reflective surface of a reflector 208. The reflector 208 tilts about the y-axis to reflect a selected spectral component back through the conversion optics 206 and the spectrally dispersive element 204 to an output waveguide 210. As shown in the y-z plane view of FIG. 2B, in this configuration there is an angle between the incoming and outgoing beams from the reflector 208 for the selected spectral component. In this configuration, the selected spectral component is reflected back to the spectrally dispersive element along substantially the same angle in the spectral plane at which the selected spectral component was dispersed, but not along the same angle in the orthogonal y-z plane.

An optical spectrum monitor may include one or more detectors at the outputs of the device to receive at least a portion of a spectral component that has been directed back to the spectrally dispersive element to provide an electrical signal proportional to the intensity of the received portion.

A calibration detector may detect spectral components from a reference input beam that has a known spectrum to provide a wavelength calibration reference. For example, a WDM input signal and a wavelength reference signal can be input utilizing a 2-fiber collimator such that actuation of the reflector enables the simultaneous scan and detection of both signals.

In some implementations, a splitter may be used to direct a first portion of a spectral component to a slow-speed detector that measures one or more parameters such as wavelength, optical power, and optical signal-to-noise ratio, and/or to direct a second portion of the spectral component to a high-speed detector that measures one or more bit rate dependent parameters such as bit rate, bit-error rate, and Q (e.g., from an eye diagram).

Part or all of the filtered output signal in an optical spectrum monitor may be directed to output paths that detect distinct polarization states. Placing different polarizers preceding different detectors, and directing the filtered output to the detectors may enable the analysis of the polarization state of the spectral components in the WDM input signal.

2 Exemplary Filter Configurations

Figure 3A:
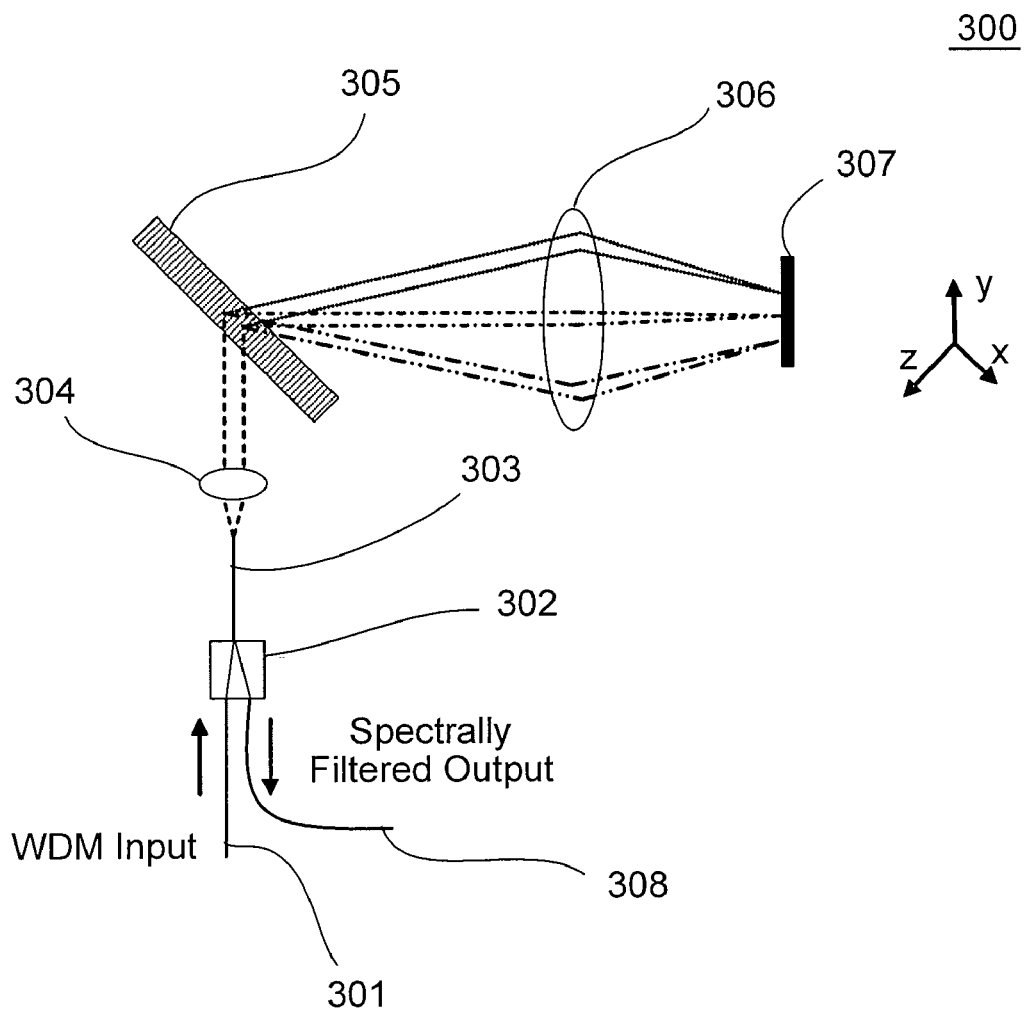
FIG. 3A is a configuration of an exemplary spectrally adjustable filter (spectral plane view).

An exemplary configuration of a spectrally adjustable filter device 300 is shown in FIG. 3A. For clarity, only one direction of the beam propagation is shown. With reference to FIG. 3A, a wavelength multiplexed input signal is provided from a device input fiber 301. In this example, the input signal passes through a fiber coupler 302 and exits an input/output fiber 303 into free space as a beam whose spatial mode is defined by fiber 303. The beam is collimated by an input/output lens 304 and then impinges on a transmissive diffraction grating 305 serving as the spectrally dispersive element, which angularly disperses the input signal into its constituent spectral components. In this configuration, the conversion optics consist of a lens 306 positioned at a distance from grating 305 such that it directs the constituent spectral components onto a tilt mirror 307, which is nominally placed at a distance from lens 306 equal to the focal length of lens 306. The tilt mirror 307 is actuated about the y-axis to selectively redirect spectral components back along their incident paths. Spectral components that are directed back along their incident paths may be coupled into input/output fiber 303, and then directed by coupler 302 to a device output fiber 308. Accordingly, spectral components that are not directed by mirror 307 back along their incident paths might not be coupled back into input/output fiber 303 and, if not coupled, will not be present in the filtered output signal of the device.

Figure 3B:
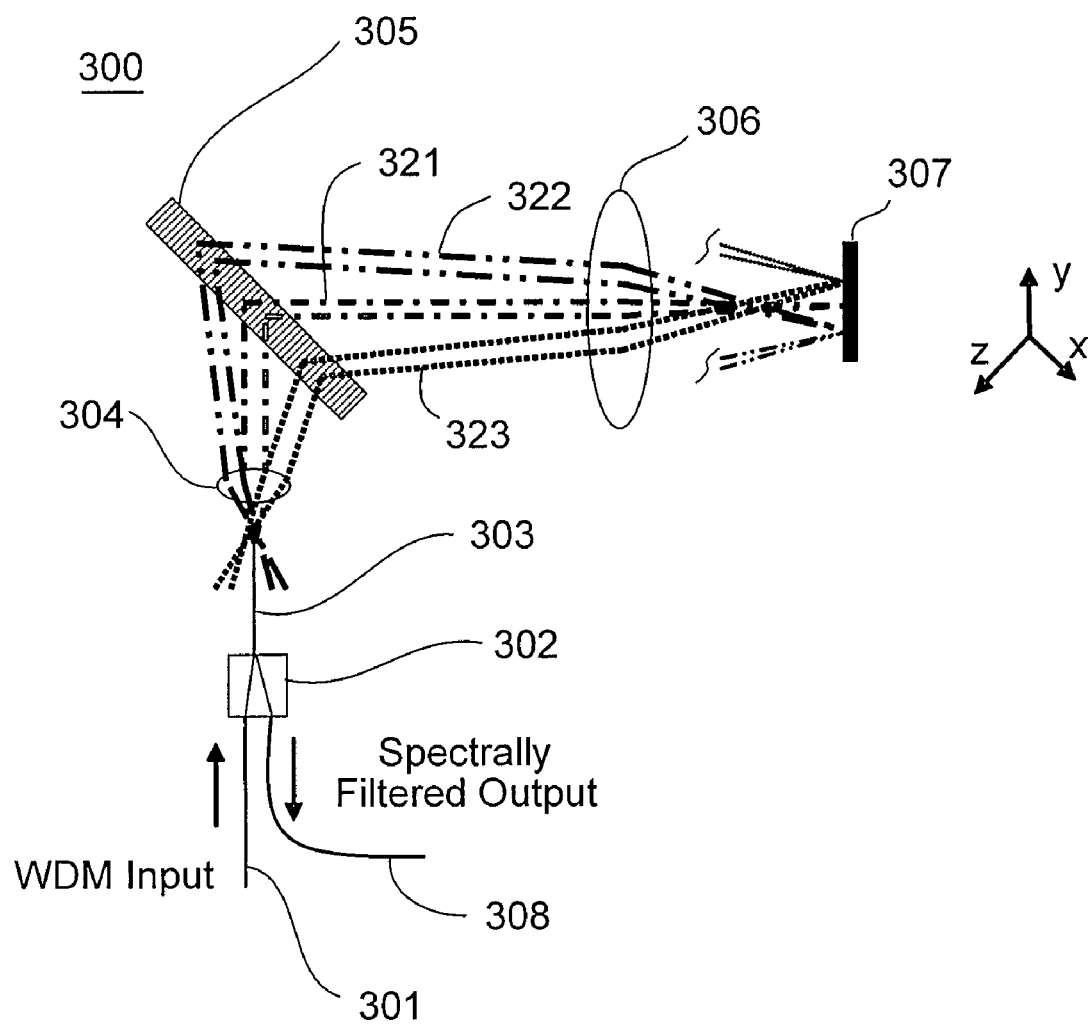
FIG. 3B is a configuration of an exemplary spectrally adjustable filter-return path (spectral plane view).

FIG. 3B shows the return paths of the constituent spectral components for a particular exemplary orientation of tilt mirror 307. In this example, only the light rays incident on mirror 307 that are substantially perpendicular to mirror 307 are coupled back into input/output fiber 303. Since each spectral component has a beam shape that is focused down near its beam waist at mirror 307, the rays within each component have substantially the same propagation direction. Thus, in this example, the central spectral component 321 is retro-reflected and outer spectral components 322 and 323 are reflected at non-zero angles back towards grating 305. The spectral resolution of device 300 determines how densely the spectral components can be spaced in frequency (or equivalently, in wavelength) and still be effectively filtered by the device. Since the spectral components can pass back through grating 305, any wavelengths close to the selected spectral component may be further dispersed prior to reaching input/output lens 304. Consequently, the spectral resolution of device 300 can be substantially doubled compared to a single pass through grating 305.

Another characteristic that affects spectral resolution is curvature of mirror 307. The reflective surface of mirror 307 is flat in device 300, but in other device configurations, the reflective surface can have finite curvature (e.g., convex or concave), while still reflecting different spectral components at different angles of incidence.

Figure 3C:
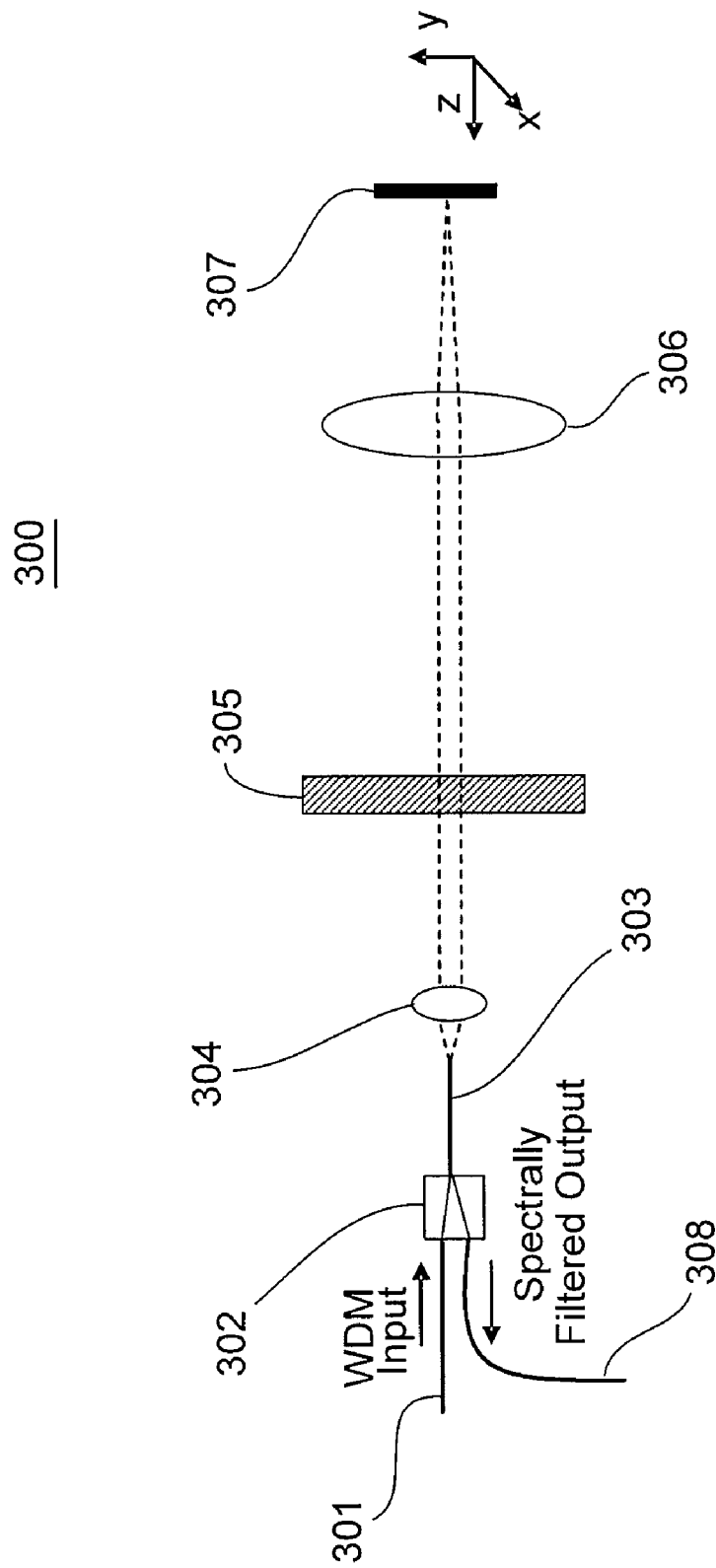
FIG. 3C is a configuration of an exemplary spectrally adjustable filter (perpendicular to spectral plane view).

FIG. 3A shows beam propagation in the spectral plane (x-z). FIG. 3C shows the beam propagation of device 300 in a plane (y-z) that is perpendicular to the spectral plane. The tilt mirror 307 can be actuated about the x-axis to optimize coupling of the beam of the selected spectral component back into input/output fiber 303. Actuation of mirror 307 about the x-axis can also be used to misalign the beam on the input/output fiber 303, to controllably induce attenuation.

Figure 3D:
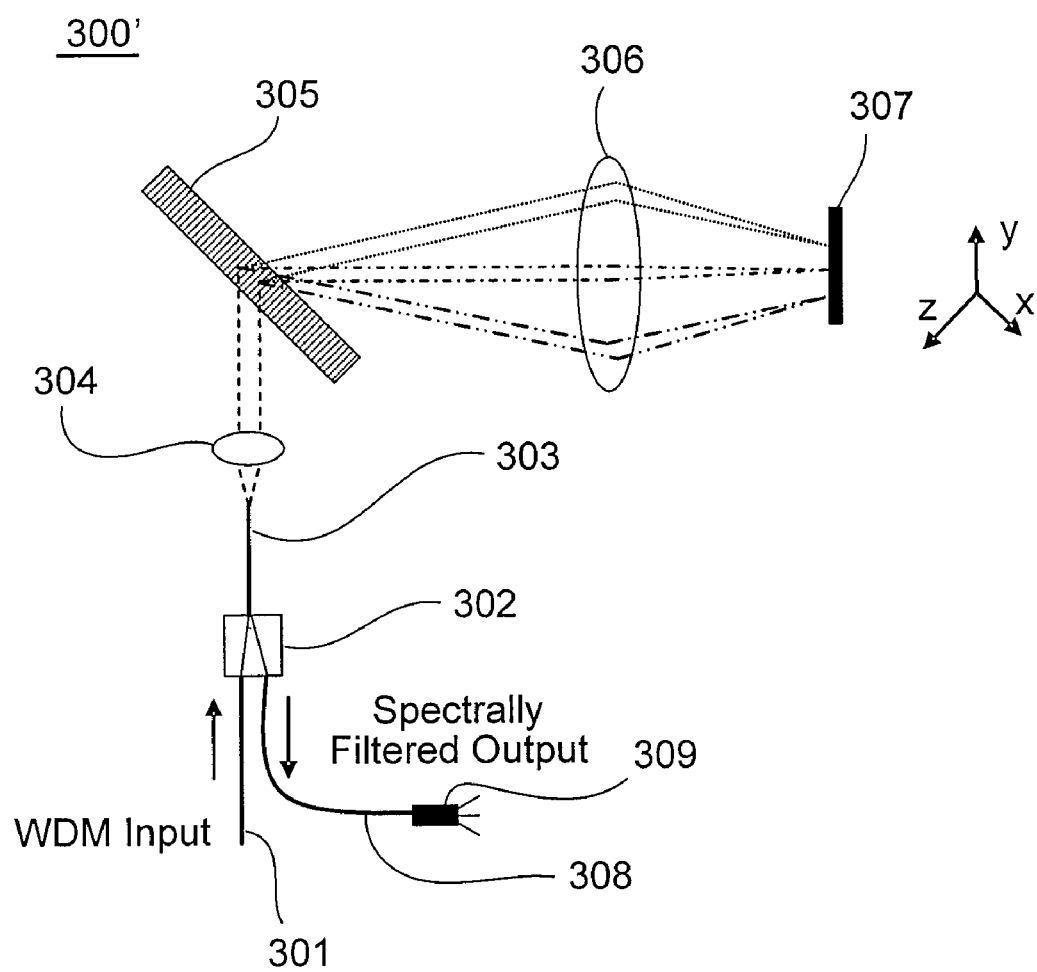
FIG. 3D is a configuration of an exemplary optical spectrum monitor (spectral plane view).

FIG. 3D shows a device 300' in which a detector 309 is placed at the output of device output fiber 308. As such, the detector 309 converts the filtered output light intensity into a proportional electrical signal level. Accordingly, by tilting the tilt mirror 307 about the y-axis and recording the electrical signal level of detector 309, the WDM input signal spectrum (e.g. wavelength, optical power, optical signal-to-noise ratio, etc.) can be discerned.

As described above, a large and well-controlled input beam on grating 305 that illuminates a large number of grating rulings may increase spectral resolution. The device 300 can provide a large beam size on grating 305 and can use conversion lens 306 to simultaneously converge the dispersed spectral components onto tilt mirror 307 and focus their beams such that the total transverse spatial extent of the components' beams on mirror 307 can be controlled. For example, the spatial extent of the beams can be similar (e.g., within 10%) to or even smaller than (e.g., by a factor of 2 or more, or 10 or more) the incident beam size on grating 305. In this example, the spatial extent of the beams on mirror 307 is primarily determined by the focal length of conversion lens 306 and the total angular dispersion of different wavelengths off of grating 305. Consequently, by proper selection of characteristics of grating 305 (e.g., pitch), the incidence angle of the input beam on the grating, and the focal length of lens 306, a large input beam can be utilized with a much smaller, commercially available, analog tilt mirror.

Further, device 300 may provide for a well-controlled input beam on grating 305 since the collimated light from input/output lens 304 may impinge directly on the grating and, in such circumstance, does not substantially vary as the spectral output of device 300 is adjusted.

Various other considerations can affect the characteristics of the optical components of device 300. From a low cost-perspective, some considerations are to employ fewer and simpler components, to keep grating size small, and to enable straightforward and high yield manufacturing processes. Along these lines, component count may be reduced by filtering the constituent spectral components based on angle through retro-reflection at the tilt mirror 307. Such an architecture may also provide for a shorter path length, and hence, a more compact device. Grating size can be reduced in that fewer tolerances need to be taken into account as the input beam on the grating is fixed. Additionally, the simple and compact architecture is highly manufacturable. For example, in device 300, the only positional or angular alignment requiring narrow tolerance is the distance between the conversion lens 306 and the tilt mirror 307.

In some implementations, the tilt range of the mirror 307 may be optimally matched with the total angular dispersion of the spectral components off of the grating 305. This enables the use of commercially available mirrors and can help optimize wavelength resolution, which is correlated with mirror angular resolution. In other words, the total angular dispersion range of the spectral components off of the grating 305 can be mapped into a smaller range (e.g. half the initial dispersion range or a tenth of the initial dispersion range) to fit within a given portion of the full tilt range of the mirror 307 (e.g., 80% of the tilt range), or into a larger range (e.g. twice the initial dispersion range or ten times the initial dispersion range) to match the desired angular range at mirror 307 (e.g., such that the tilt range covers half of the dispersion range, as described below for the enhanced resolution optical spectrum monitor). In particular, the magnification/de-magnification of the imaging system can determine the ratio of the total angular dispersion of the spectral components off grating 305 relative to the total angular dispersion of the spectral components at the mirror 307. Moreover, the angular magnification/de-magnification can be determined by selection of the distance between lens 306 and grating 305 and the focal length of lens 306.

Figure 4A:
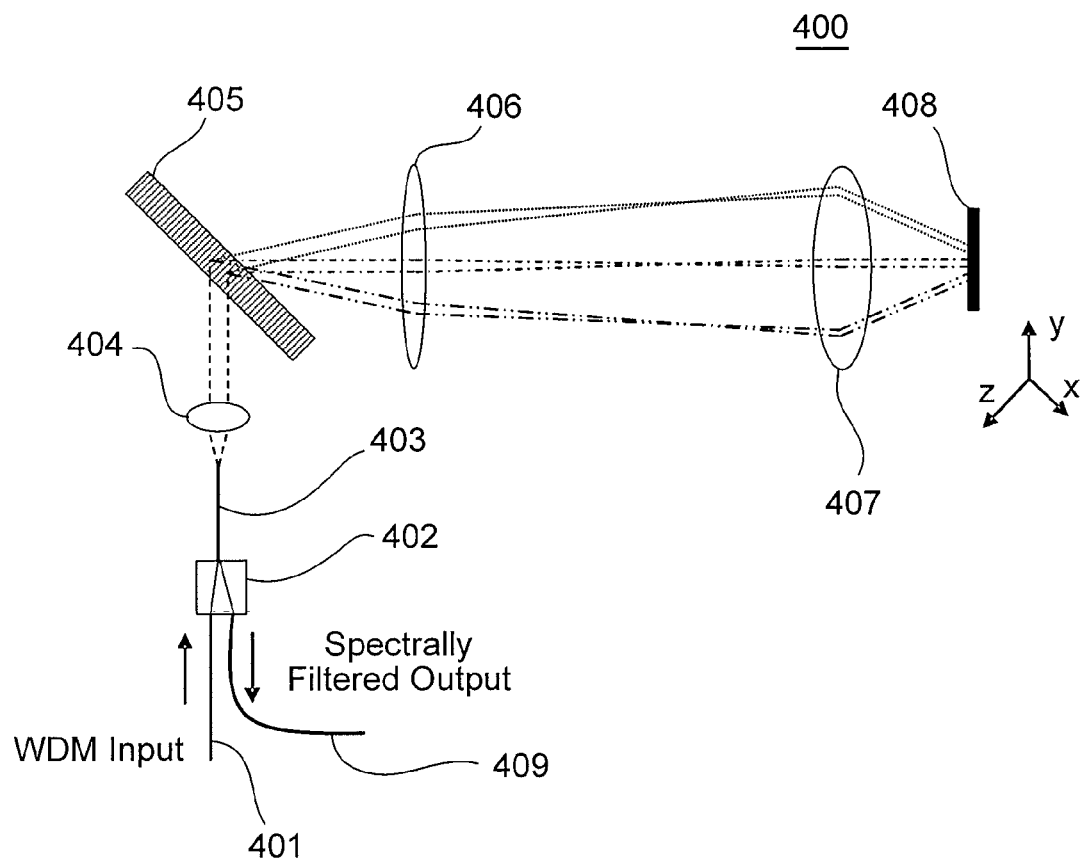
FIG. 4A is an exemplary configuration of an exemplary spectrally adjustable filter with two lenses (spectral plane view).
Figure 4B:
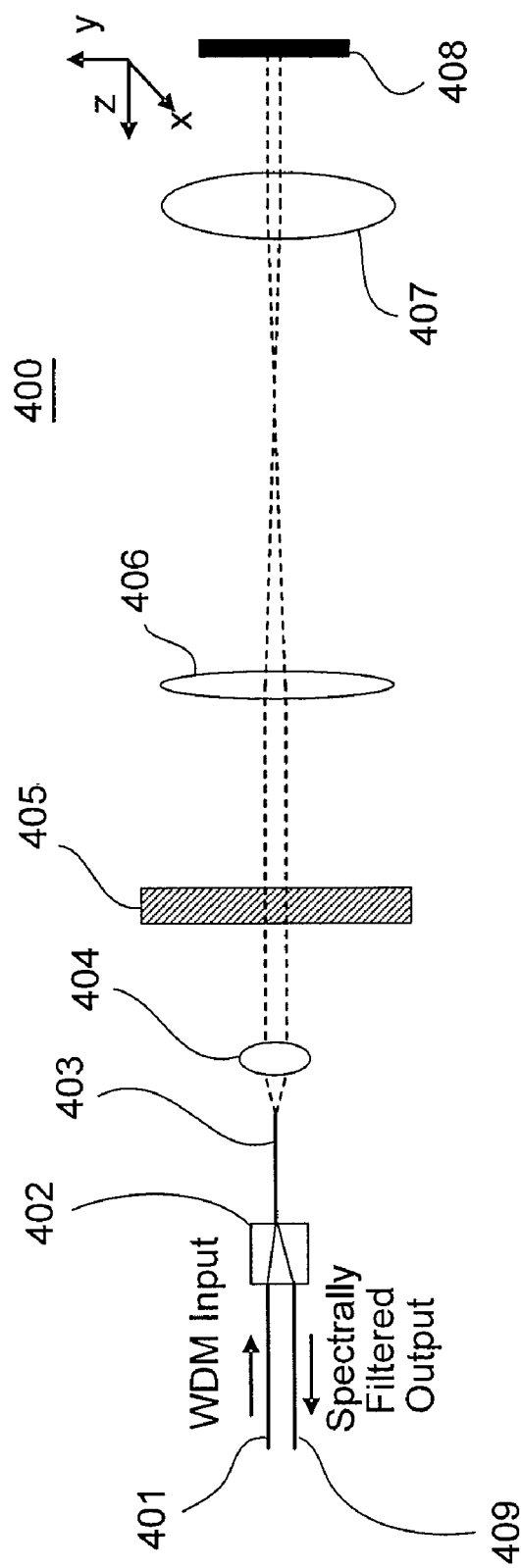
FIG. 4B is an exemplary configuration of an exemplary spectrally adjustable filter with two lenses (perpendicular to spectral plane view).

FIGS. 4A and 4B show another exemplary configuration in which a second conversion lens is added to the optical path. With reference to FIG. 4A, a device 400 includes a device input fiber 401, a fiber coupler 402, an input/output fiber 403, an input/output lens 404, and a transmissive diffraction grating 405. In this configuration, the conversion optics consist of two conversion lenses, 406 and 407, that act in concert to direct the angularly dispersed spectral components onto a tilt mirror 408. FIG. 4B shows propagation of the beams in a plane (y-z) perpendicular to the spectral plane (x-z). The separation between lens 406 and lens 407 is substantially the sum of their focal lengths, such that collimated beams incident at lens 406 also are collimated after they exit lens 407. Two conversion lenses may enable greater flexibility in optimizing the combination of a) the size of the input beam on grating 405 relative to the spatial extent of the beams at mirror 408, b) the angular magnification/de-magnification, c) the path length, and d) the sizes and positions of the beams on the conversion lenses 406 and 407. The sizes and positions of the beams on the conversion lenses 406 and 407 can be important because the aberration of a spherical lens is largely determined by the size and position of a beam on the lens relative to the lens focal length. Consequently, proper design can reduce aberration and enable the use of spherical lenses which are generally much less expensive than aspherical lenses.

There is flexibility in arrangement of the spectral components on mirror 408. For example, for either device 300 or device 400, the spectral components are not required to be coincident at mirror 408 (though they can optionally be coincident at mirror 408). Such flexibility provides tolerance to design and/or manufacturing variations. That is, the individual spectral components do not need to be directed by the conversion lenses 406 and 407 to the same position at mirror 408. The conversion lenses 406 and 407 direct the spectral components onto mirror 408 such that the spatial extent of the light is substantially within the dimensions of mirror 408 and such that actuation of the mirror 408 results in the re-direction of particular spectral components back along their incident paths. Consequently, there is significant flexibility in optimizing device cost, performance, size, and manufacturability.

Figure 5:
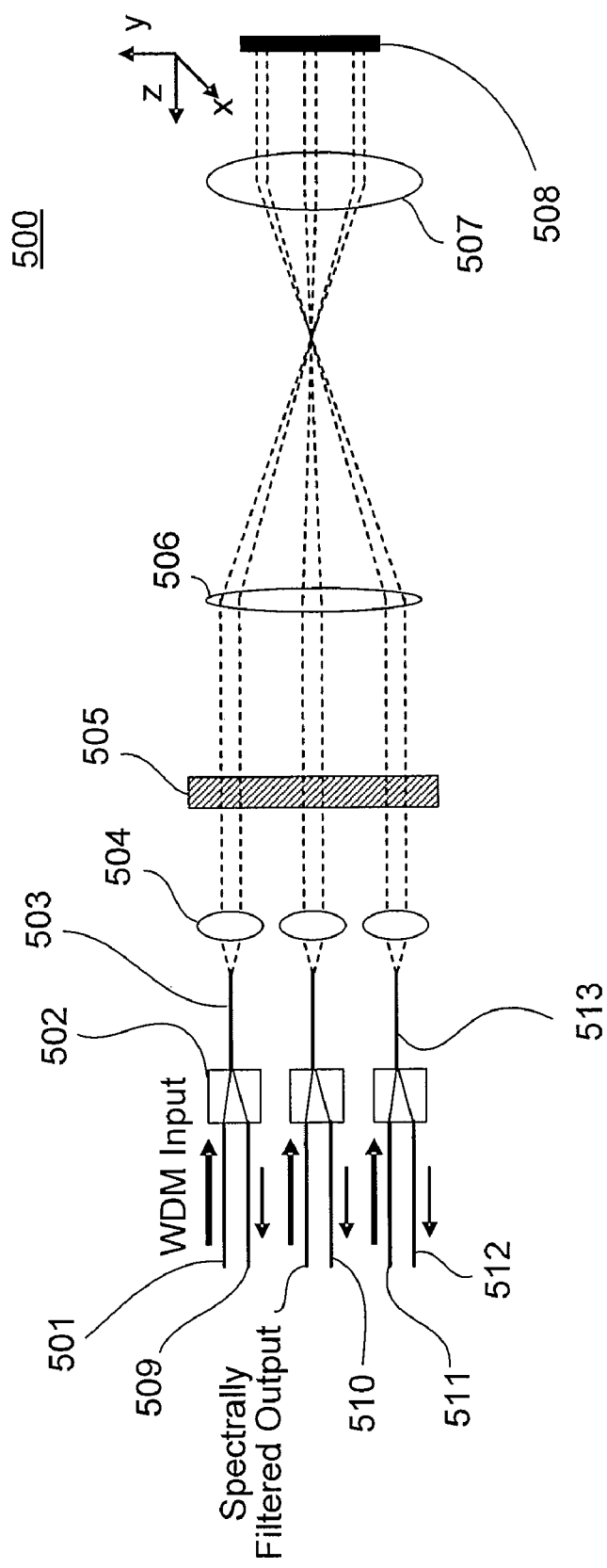
FIG. 5 is an exemplary configuration of an exemplary spectrally adjustable filter with multiple inputs and outputs (perpendicular to spectral plane view).

In another exemplary configuration, shown in FIG. 5, a device 500 allows for multiple device inputs and outputs. In other words, multiple WDM input signals can be processed by the same device. One potential advantage of having a single device process multiple WDM signals is that there is a significant cost savings per WDM signal processed as many of the optical components are shared in the processing function. With reference to FIG. 5, which displays beam propagation in the y-z plane (perpendicular to the spectral plane), multiple WDM input signals enter the device 500 at input fibers 501, 510, and 512. Each input signal passes through a respective fiber coupler 502, input/output fiber 503, and input/output lens 504. The input signals may be processed simultaneously by a single diffraction grating 505, conversion lenses 506 and 507, and a single tilt mirror 508. In particular, actuation of mirror 508 about the x-axis affects the level of light intensity coupled into the respective output fibers 509, 511, and 513. The spectral plane view for each of the WDM input signals of device 500 is identical to that shown in FIG. 4A. Accordingly, actuation of mirror 508 about the y-axis may selectively redirect a selected spectral component of each input signal back along their incident paths such that they are coupled into their respective output fibers 509, 511, and 513. Hence, by actuation of mirror 508 about the x- and y-axes, multiple WDM input signals can be filtered and attenuated by device 500. By placing detectors at the exit of output fibers 509, 511, and 513, the optical spectra of multiple WDM input signals can be detected and analyzed.

Additional potential advantages of the multiple input/output device 500, that also may hold for other implementations, are that the device scales directly from a single input geometry, that for parallel input beams all signals can be aligned and scanned simultaneously, and that the spatial extent of the input beams in the y-direction can be reduced at mirror 508 by the ratio of the focal length of lens 506 to the focal length of lens 507. In particular, large and multiple beams incident on grating 505 can be converted to a much smaller spatial extent on mirror 508. The multiple beams may be directed to different locations of the grating 505, but can be directed to close locations (e.g., within 1 or 2 or 3 beam diameters of each other) to reduce the size, and hence cost, of the grating 505.

Figure 6:
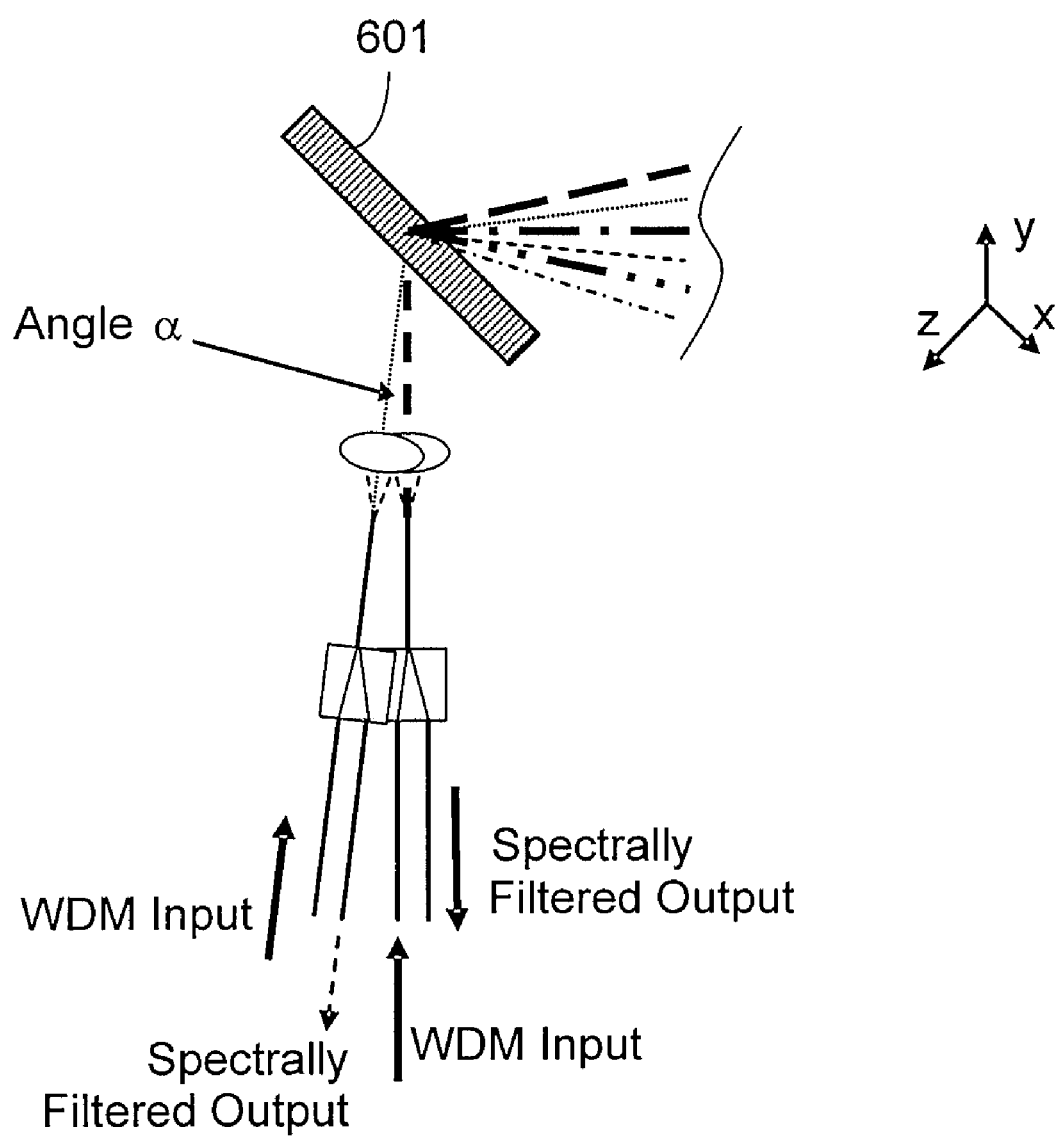
FIG. 6 is a diagram of two WDM input signal beams separated by an angle and incident on an exemplary diffraction grating (spectral plane view).

Another exemplary variation of a multiple input/output device is to configure the input beams of different WDM input signals to be incident on the grating at a non-zero angle relative to each other in the spectral plane. FIG. 6 shows a portion of a device in which different WDM input signals arrive at a grating 601 at different angles of incidence (by an angle α) and are separated vertically (along the y-axis). In this example, the spectra of two such WDM input signals are dispersed by grating 601 at different angles. Consequently, the two filtered outputs of the device would have different spectral components (having different peak wavelengths) for a given tilt mirror position. Such a configuration would enable a single device with a single spectrally dispersive element to filter different spectral regions. One exemplary application of such a device would be a dual band optical spectrum monitor (e.g. a C+L band WDM optical spectrum monitor) in which a WDM signal is split into different spectral bands that are sent into the different device inputs. One input/output could measure one spectral band (e.g. the C-band), while the other input/output could measure a second band (e.g. the L-Band). Similarly, an enhanced resolution optical spectrum monitor could be optimized such that each input/output measures half of a band, effectively doubling the resolution for the full band.

Figure 7A:
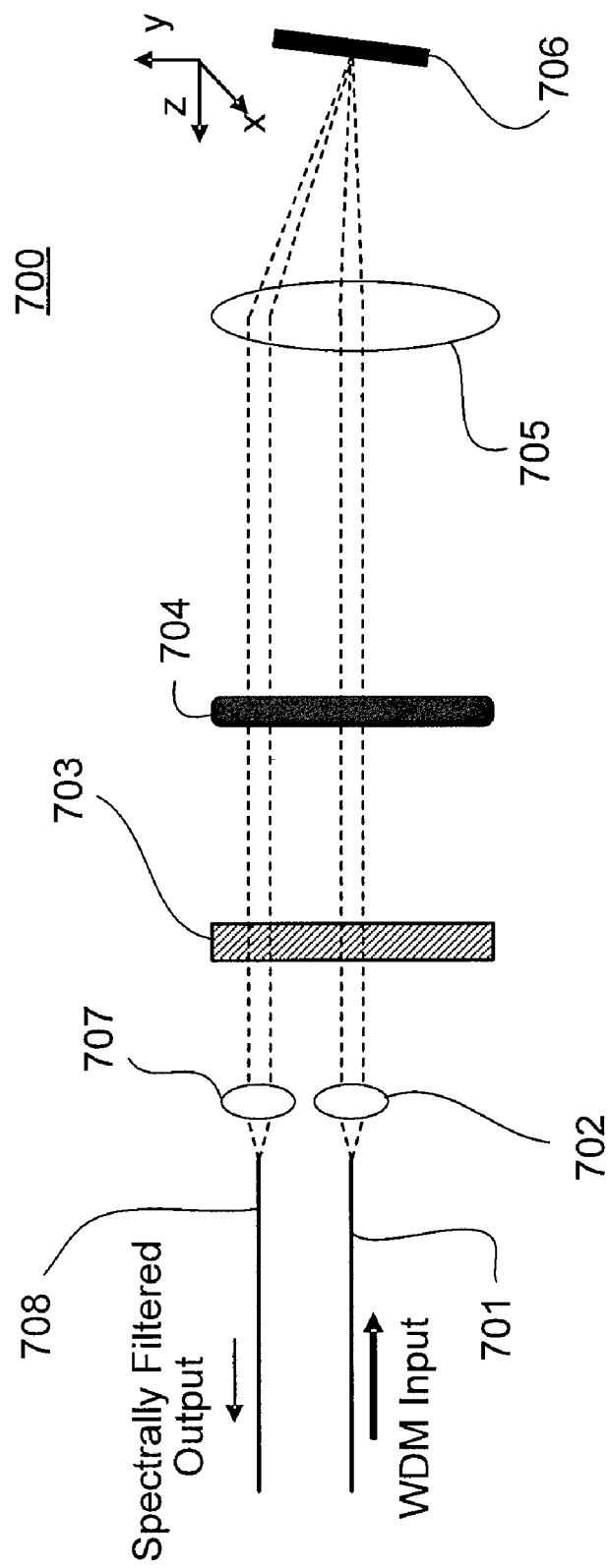
FIG. 7A is an exemplary configuration of an exemplary spectrally adjustable filter with different input and output paths (perpendicular to spectral plane view).
Figure 7B:
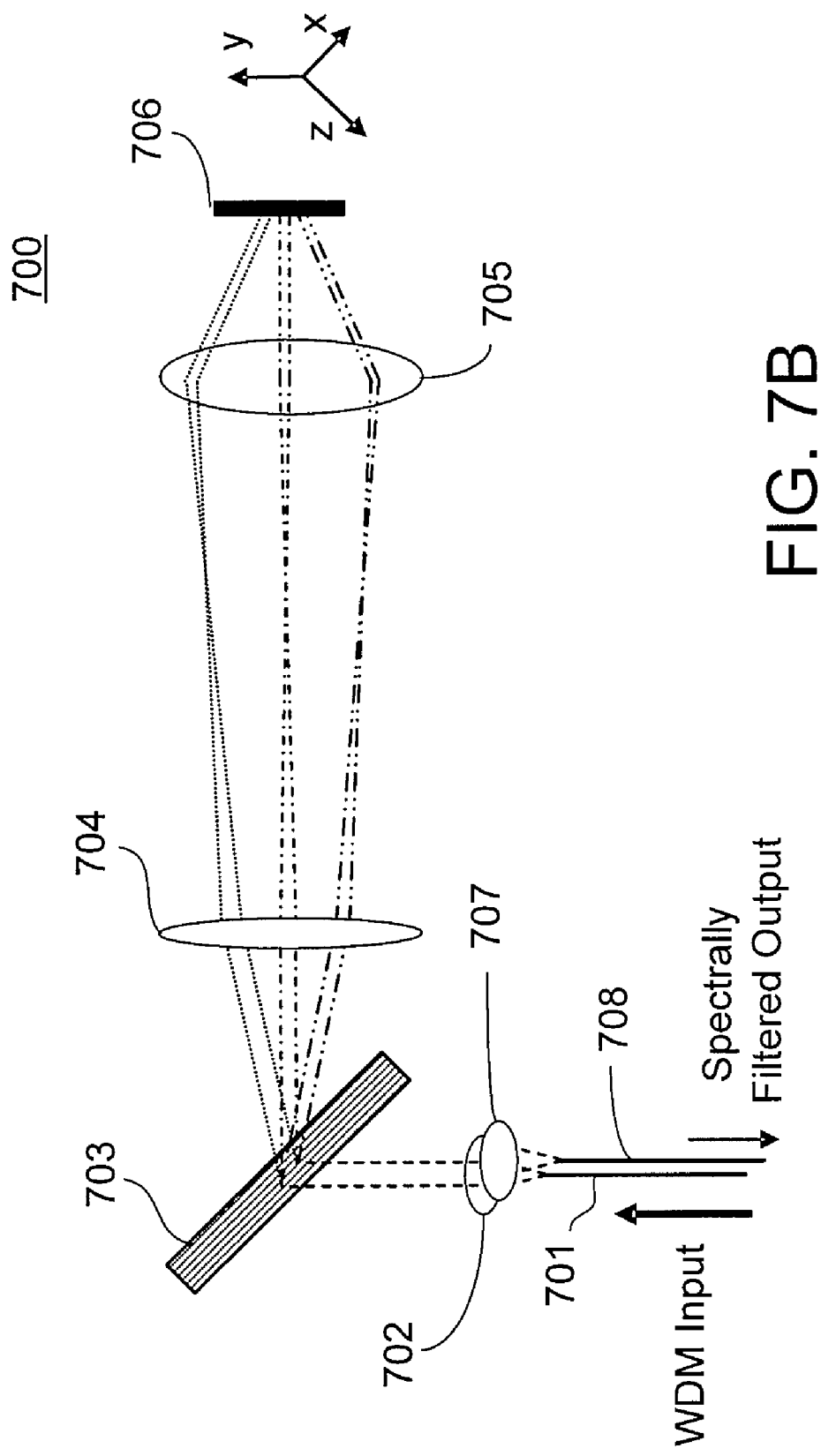
FIG. 7B is an exemplary configuration of an exemplary spectrally adjustable filter with different input and output paths (spectral plane view).

FIGS. 7A and 7B show an exemplary configuration with different input and output paths. FIG. 7A shows beam propagation in the y-z plane (perpendicular to the spectral plane), and FIG. 7B shows beam propagation in the spectral plane (x-z). In this example, a WDM input signal enters a device 700 at an input fiber 701. The beam from the fiber 701 is collimated by an input lens 702 and impinges on a diffraction grating 703. After the input beam passes through grating 703 the dispersed beams of the different spectral components pass through a cylindrical conversion lens 704. The cylindrical lens is oriented such that focusing occurs in the x-z plane (the spectral plane), and no focusing occurs in the y-z plane (perpendicular to the spectral plane). The beams are then focused by a conversion lens 705 onto a tilt mirror 706. Mirror 706 may be positioned at a distance from lens 705 substantially equal to the focal length of lens 705. The tilt mirror 706 tilts about the y-axis to reflect the beam of the selected spectral component back toward lens 705. The tilt mirror 706 may be also tilted about the x-axis to a predetermined angle, but in this instance this angle (in the y-z plane) may be kept substantially fixed during operation while the mirror 706 is being tilted about the y-axis to select a spectral component.

As further shown in this exemplary configuration, the selected return beam is substantially parallel to the incoming beam and is displaced in the y-axis by a distance proportional to the angle at which mirror 706 is tilted about the x-axis. The selected beam again passes through cylindrical lens 704 and grating 703 and is focused by an output lens 707 into an output fiber 708. Accordingly, actuation of mirror 706 about the x-axis may serve to optimize or attenuate the spectrally filtered output. The exemplary spectral filtering mechanism of device 700 is shown in the spectral plane view of FIG. 7B wherein actuation of the tilt mirror 706 about the y-axis serves to selectively direct a particular spectral component to the output fiber 708.

Device 700 can be scaled to more than two input/output fibers. Accordingly, other embodiments include, for example, actively directing filtered spectral components to different output fibers, selectively directing multiple WDM input signals to a single output fiber and associated detector, and permutations thereof to realize multi-fiber adjustable wavelength switches and multi-fiber optical spectrum monitors.

Figure 8:
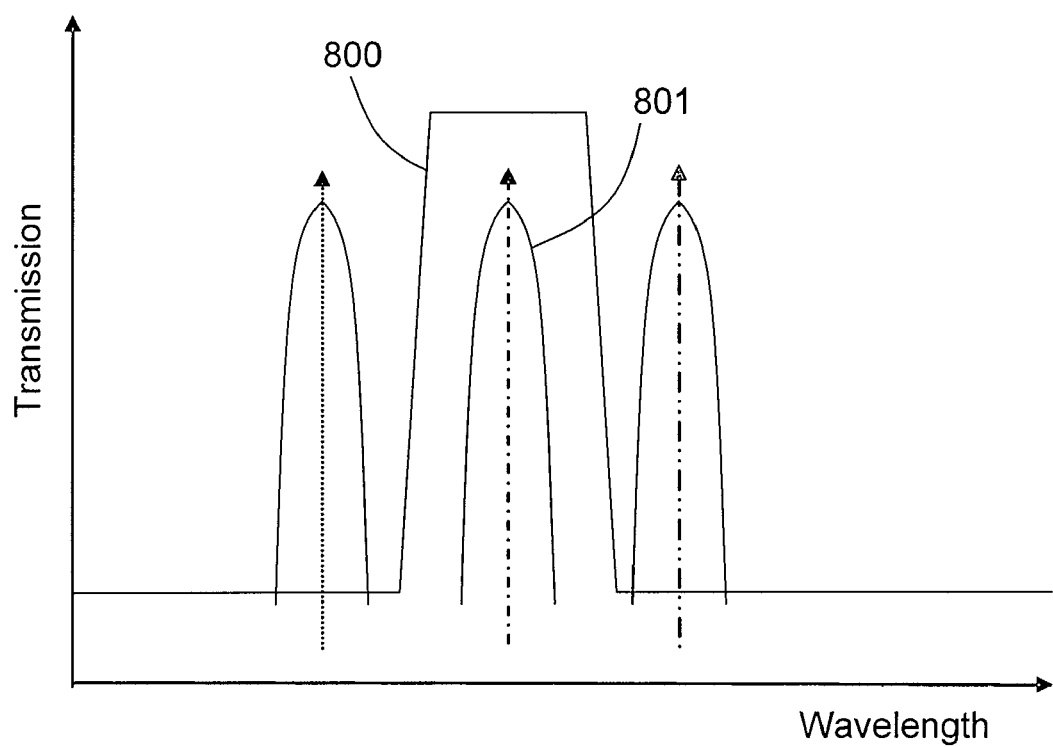
FIG. 8 is a plot of an exemplary flat, wide spectral filter bandpass shape.

For some spectrally adjustable filtering and optical spectrum monitoring applications, it may be desirable that the spectral filter shape does not significantly alter the spectral or frequency content of individual transmission channels. For example, in an application in which there is a bandpass transmission spectrum to select a single WDM channel, a flat and wide bandpass shape may be preferable as it minimizes distortion of the transmitted WDM channel, while filtering out the remainder of the spectrum. FIG. 8 displays an exemplary bandpass shape 800 in which the transmission is flat over the wavelength range that comprises substantially all of the spectral content 801 of the spectral component of the selected WDM channel. Further, the transmission falls off rapidly to a negligible level such that the WDM channels outside of the passband are effectively extinguished.

Figure 9A:
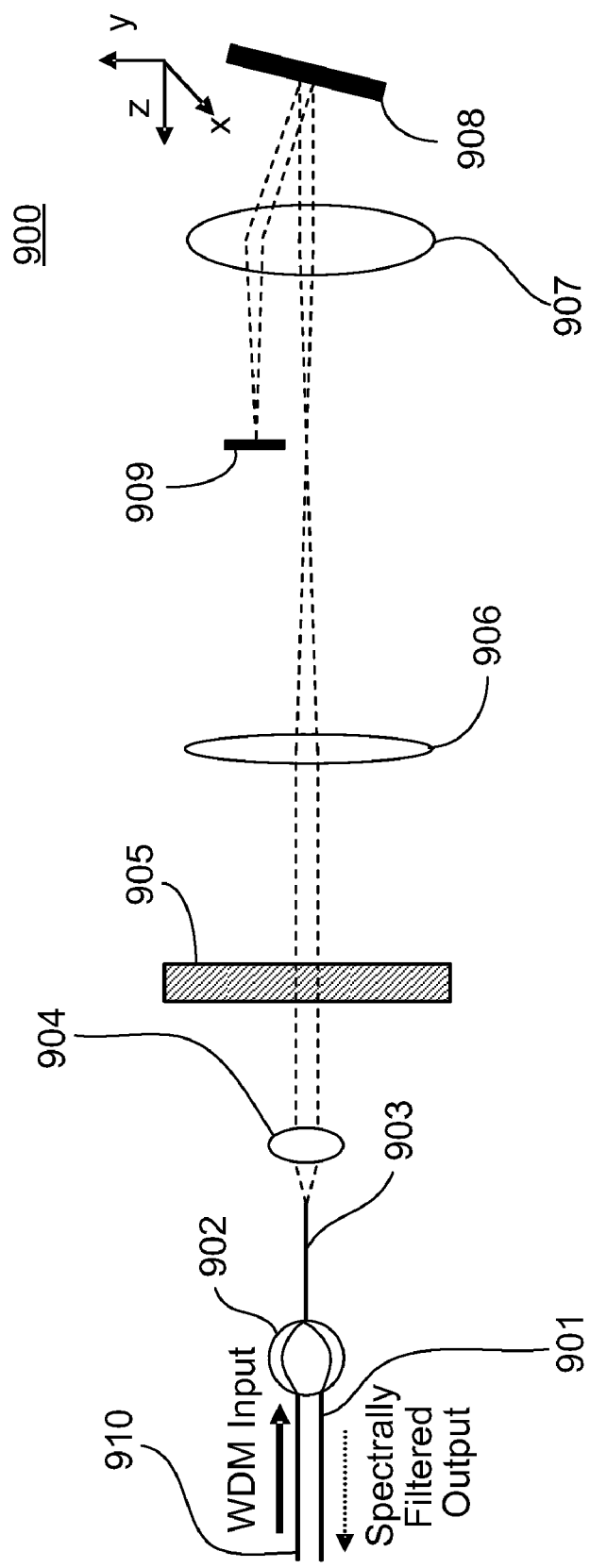
FIG. 9A is an exemplary configuration of spectrally adjustable filter with wide and square bandpass shape (perpendicular to spectral plane view).
Figure 9B:
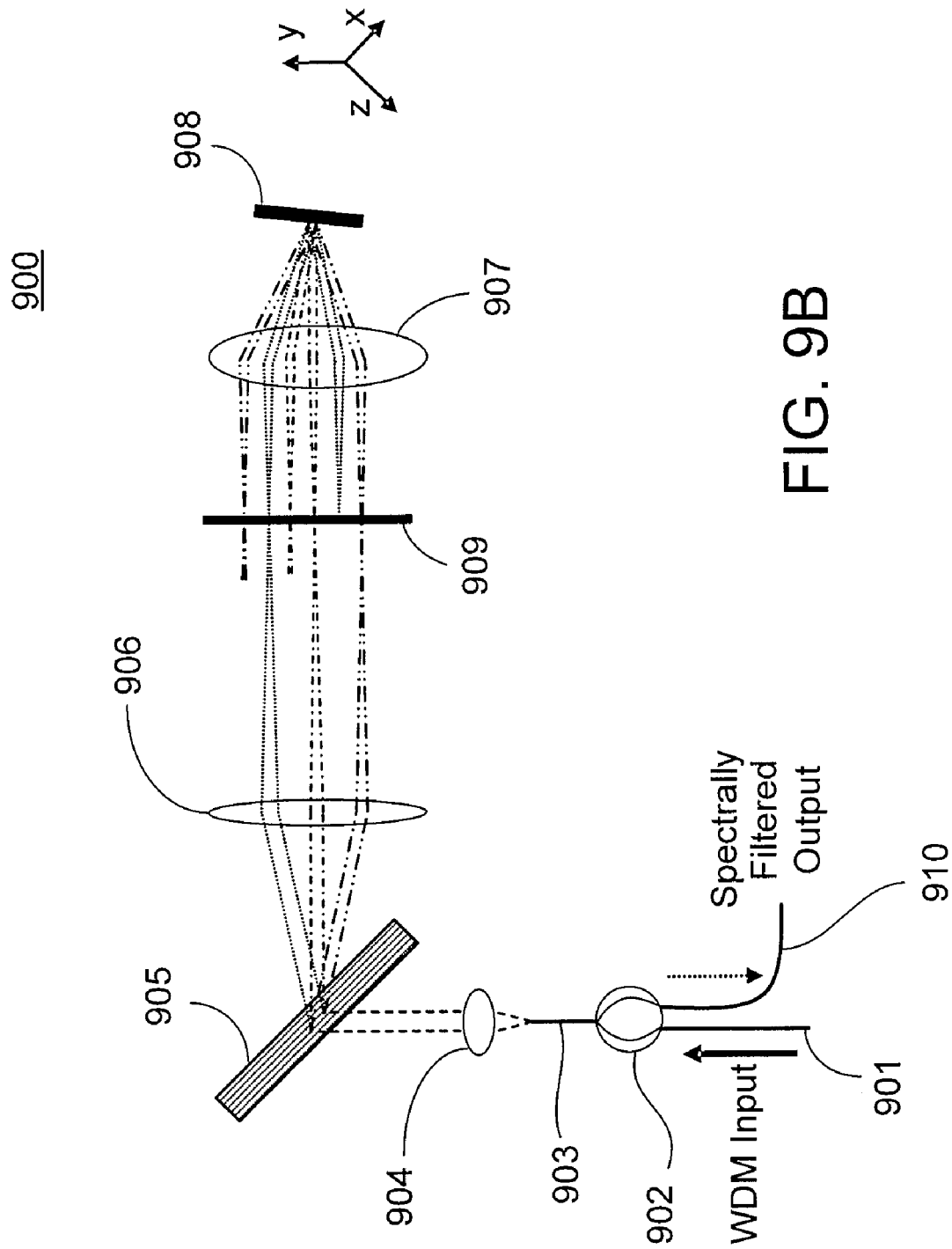
FIG. 9B is an exemplary configuration of an exemplary spectrally adjustable filter with wide and square bandpass shape (spectral plane view).
Figure 9C:
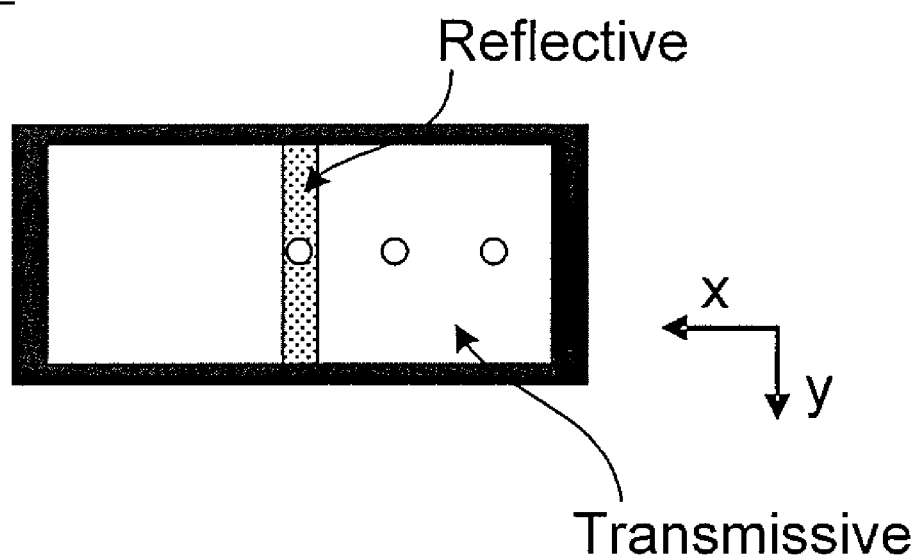
FIG. 9C is an exemplary slit reflector.

Another exemplary device configuration that provides for a flat and wide passband is shown in FIGS. 9A-9C. With reference to FIG. 9A (y-z plane view), in this example the WDM input signal enters a device 900 at a device input fiber 901. After passing through a circulator 902 and an input/output fiber 903, the WDM input signal is collimated by an input/output lens 904. The input signal then impinges on a transmission grating 905, wherein it is dispersed into its constituent spectral components.

As shown in FIG. 9B (x-z plane view), in this example the dispersed spectral components are imaged by conversion lenses 906 and 907 onto a tilt mirror 908. In particular, conversion lens 906 is placed at a distance from grating 905 substantially equal to the focal length of lens 906. Accordingly, in this configuration the beams of the individual spectral components are essentially parallel to one another after passing through lens 906. Each individual spectral component beam comes to a focus in between lens 906 and lens 907 and then expands such that the beam is again collimated as it exits lens 907. Where suitable, to achieve such re-collimation, lens 907 may be placed at a distance substantially equal to the sum of the focal lengths of 906 and 907. A tilt mirror 908 may be located at a distance from lens 907 substantially equal to the focal length of lens 907, such that the individual spectral beams converge to essentially the same point on mirror 908.

As shown in FIG. 9A, in this example tilt mirror 908 is actuated about the x-axis such that the dispersed spectral component beams are directed back, at an angle relative to the incident path, through lens 907. After passing through lens 907, the beams come to a focus in the y-axis at a slit reflector 909, which is placed at a distance from lens 907 substantially equal to the focal length of lens 907. Slit reflector 909 is oriented such that the reflecting surface is normal to the propagation direction of the incident spectral component beams. As shown in the spectral plane view of FIG. 9B, the individual spectral component beams are essentially parallel after passing through lens 907 and each beam comes to a focus in the x-axis at slit reflector 909.

FIG. 9C shows the exemplary slit reflector 909 in the x-y plane. In this example, actuation of mirror 908 about the y-axis moves the spectral component beams relative to the (stationary) slit reflector 909 such that only a single selected spectral component is reflected. Thus, in this example, only the spectral component that is reflected by the slit reflector 909 will be directed back along its incident path, and hence, will be re-coupled into input/output fiber 903 for transmission out through circulator 902 and device output fiber 910. In this configuration, the width and uniformity of the reflective slit of the slit reflector 909 largely determines the width and flatness of the passband of the spectrally filtered output signal. Other factors may also affect the spectral passband, including the spectral dependence of the grating 905 and the other optical components and the aberrations of the input and conversion optics. Where suitable, these other factors can be designed to minimize their effects or to act in concert with the slit reflector 909 to achieve the targeted spectral filter passband shape. As with the other spectrally adjustable filter configurations, the device 900 can be adapted to an optical spectrum monitoring system by addition of a detector at the egress of device output fiber 910.

3 Exemplary Optical Spectrum Monitor

Figure 10A:
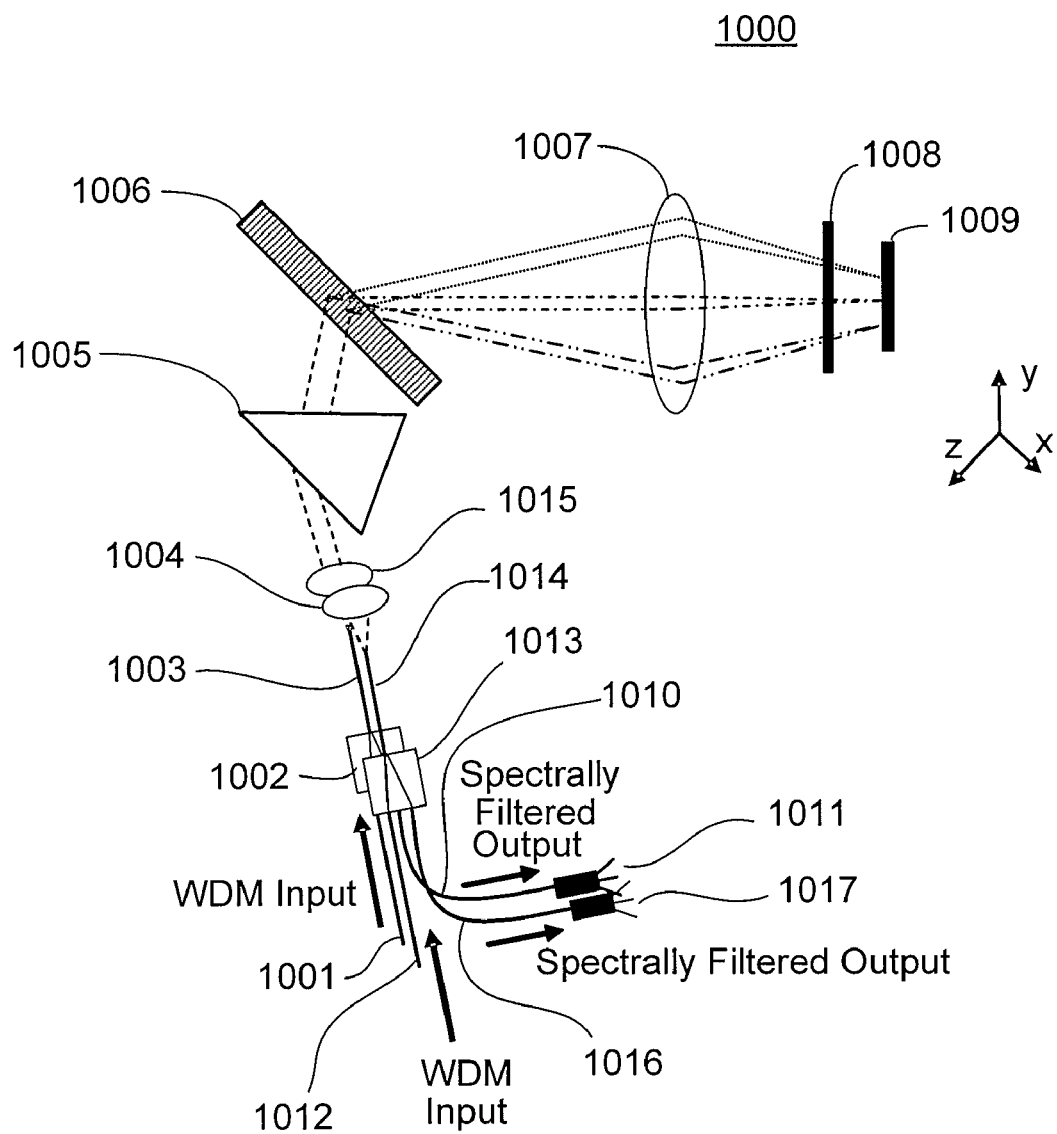
FIG. 10A is an exemplary two-port optical spectrum monitor (spectral plane view).
Figure 10B:
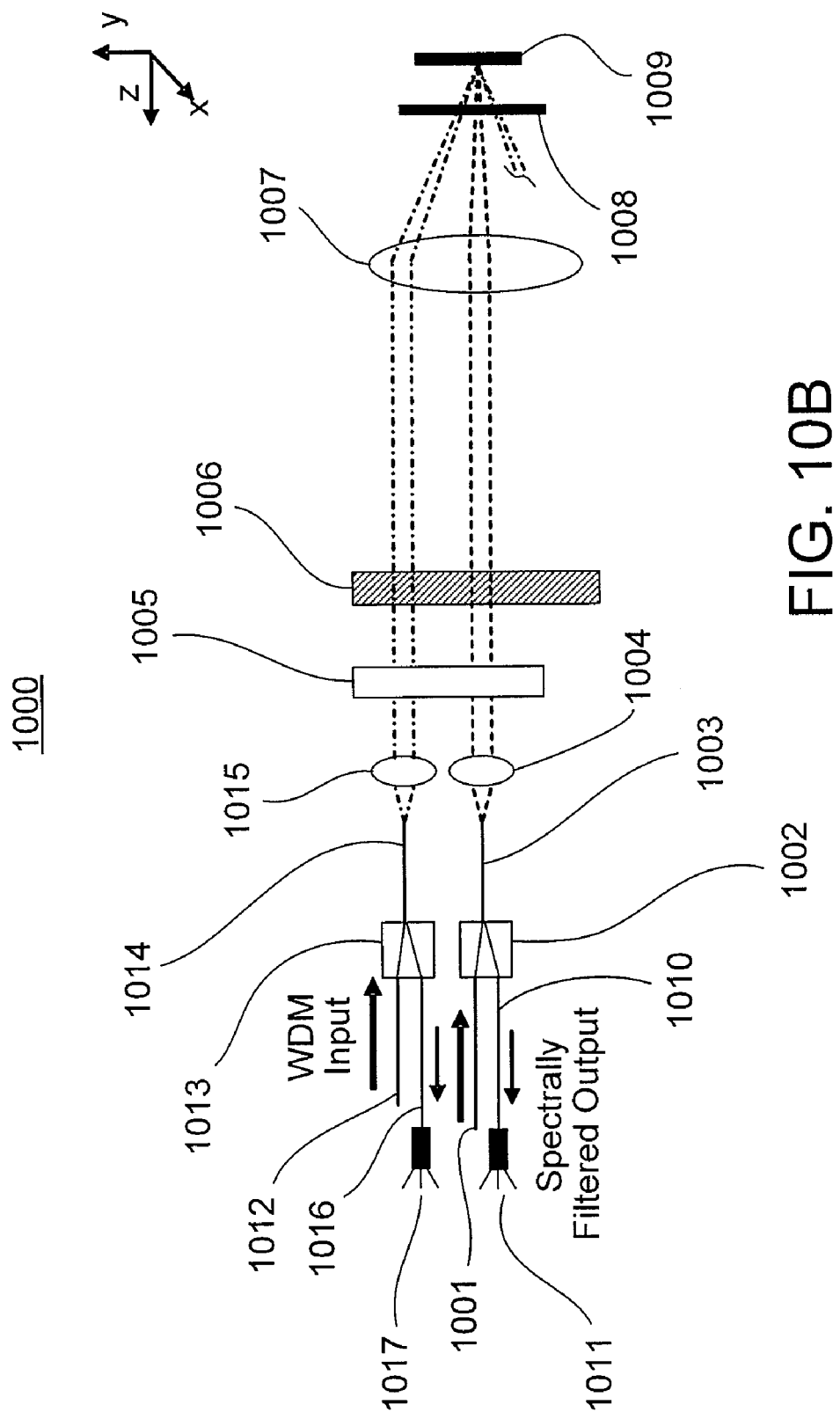
FIG. 10B is an exemplary two-port optical spectrum monitor (perpendicular to spectral plane view).

An example of a two-port, C-Band (1525 to 1565 nm), optical spectrum monitor is shown in FIGS. 10A (x-z plane view) and 10B (y-z plane view). With reference to FIG. 10, an exemplary device 1000 possesses two device input fibers 1001 and 1012 with a different WDM input signal entering each of the device input fibers. The WDM input signals are comprised of transmission channels with wavelengths in the C-band (1525 to 1565 nm). The device input fibers are, for example, standard SMF-28 single mode optical fiber. In other examples, the input fibers can be any useful fibers, for example, an array of fibers in v-grooves, or multiple fibers in a single glass ferrule.

In this example, the two WDM input signals pass through fiber couplers 1002 and 1013, respectively, wherein the fiber couplers are wideband, 1×2 fused fiber couplers with a 50/50 split ratio. That is, approximately 50% of the light incident at device input fiber 1001 is transmitted through fiber coupler 1002 to input/output fiber 1003. The wideband nature of the coupler may ensure that the insertion loss through the coupler does not vary significantly, typically less than 1.0 dB, over the wavelength range of 1525 to 1565 nm. In other examples, various types of directional couplers can be used including, for example, fiber couplers with different transmission ratios between the ports, circulators, or other kinds of optical splitters in which the input and/or output signals are split into multiple paths.

Input/output fiber 1003 and input/output lens 1004 may be combined within a standard optical fiber collimator, herein referred to as the bottom collimator. Similarly a standard optical fiber collimator may be utilized for the combination of input/output fiber 1014 and 1015, herein referred to as the top collimator. In this exemplary configuration, each beam emanating from the fiber collimators has a $1/e^2$ beam diameter of 1.2 mm. Further, the output beams exiting the top and bottom collimators at lens 1004 and lens 1015 are aligned to be parallel to each other within +/−0.25 degrees. The fiber collimators are stacked on top of each other, perpendicular to the spectral plane (x-z plane), with a separation of 2.5 mm. Herein, the y-axis (perpendicular to the spectral plane) may be referred to as the vertical axis. An axis within the spectral plane and orthogonal to a beam propagation axis may be referred to as the horizontal axis. As with other axial designations, it is understood that such designations are utilized for convenience and clarity only, and should not be construed as limitations on the invention.

In this exemplary configuration, the beams exiting the collimators are then incident on an input beam expansion prism 1005 at a nominal angle of 68 degrees relative to the normal. The separation between the collimators and the prism is approximately 8 mm. One purpose of prism 1005 is to expand the beams in the spectral plane for enhanced spectral resolution. In this example, the expansion prism is a right-angle prism with a prism angle of 40 degrees, has an index of refraction 1.507 at 1545 nm, and is anti-reflection (AR)-coated for low polarization dependent loss (PDL) at a nominal incidence angle of 68 degrees relative to the normal of the hypotenuse. Accordingly, the incident beams in this configuration are expanded by a factor of approximately 2.1 in the spectral plane to horizontal axis beam diameters of 2.5 mm. The collimators and the expansion prism 1005 are examples of input optics that can be used to prepare the input beam before dispersal. In other examples, various types of input optics can include, for example, arrays of fibers in v-grooves, multi-fiber ferrules, or discretely mounted fibers followed by combinations of spherical lenses, aspherical lenses, cylindrical lenses, achromatic lenses, an array of lenses, and anamorphic prisms.

The spectrally dispersive element may be a transmissive diffraction grating 1006 that is set at a useful distance, for example approximately 8 mm from prism 1005, and the expanded beams may impinge on grating 1006 at an angle of, for example, 50.0 degrees relative to the grating normal. To account for the spatial extent of the beams and tolerances, the clear aperture of the grating may be designed to be approximately 5 mm in the vertical direction by 9 mm in the horizontal direction (more than ten times the spatial extent in the horizontal direction at the mirror 1009). With an exemplary grating resolution of 966 lines per mm, the wavelength range of 1525 to 1565 nm is dispersed over an angular range of 3.23 degrees, centered at 46.7 degrees from the grating normal. In other examples, the spectrally dispersive element can be a reflective diffraction grating, or a diffraction grating that includes other elements. For example, the spectrally dispersive element can be a double-passed transmissive or reflective diffraction grating in which a beam diffracts off the grating, reflects off a fixed mirror and then diffracts again off of the grating prior to impinging on the conversion optics.

In the example, the dispersed spectral components propagate to an aspherical conversion lens 1007, which converges and focuses the beams through a quarter waveplate 1008 onto a tilt mirror 1009. The conversion lens 1007 is an AR-coated asphere with index of refraction 1.507, a focal length of 18 mm, and is placed 63 mm from grating 1006. The clear aperture of lens 1007 is approximately 8.0 mm to account for a separation of 3.6 mm between the 1525 and 1565 nm beams, for beam diameters of nearly 2.8 mm that resulted after the anamorphic expansion by grating 1006, and for alignment tolerances. In this exemplary configuration, the focal length and spacing of conversion lens 1007 result in an angular magnification of 2.5, such that the angular range, in FIG. 10A, of the propagation axes of the incident beams converging on tilt mirror 1009 is 8.1 degrees. Further, the 2.5 mm spacing between the top and bottom collimator beams results in a 7.9 degree vertical angular range between the focused beams of FIG. 10B. Other conversion optics can include, for example, spherical lenses, aspherical lenses, cylindrical lenses, achromatic lenses, an array of lenses, and anamorphic prisms.

In this example, the quarter waveplate 1008, with a clear aperture of approximately 4 mm square, is placed at a distance of 12 mm from lens 1007 and is oriented with its principle axis at 45 degrees relative to the spectral plane. One purpose of the waveplate is to minimize PDL in the device 1000 by rotating the WDM input signal polarization by 90 degrees such that any polarization dependence of the transmission grating 1006 or other similarly oriented components along the input path is offset on the return path.

Exemplary tilt mirror 1009 may be located at a distance from lens 1007 substantially equal to the focal length of lens 1007, namely 18 mm in the exemplary configuration. In these circumstances, at the mirror surface, the spatial extent of the beams in the horizontal dimension is about 700 microns, which results from 682 microns in separation of wavelengths 1525 and 1565 nm added to diffraction-limited $1/e^2$ beam diameters of approximately 10 microns. In the vertical dimension, the spatial extent of the beams is under 100 microns including the beam-to-beam separation and the diffraction-limited $1/e^2$ beam diameters of approximately 20 microns. Accordingly, the tilt mirror 1009 has an optically usable diameter of greater than 1.0 mm. Further, mirror 1009 has a greater than 97% reflective surface and possesses an angular tilt range of +/−5 degrees in each of two axes. The tilt mirror 1009 can be, for example, an analog MEMS tilt mirror (1 axis or 2 axis), a resonant scanning MEMS mirror, or any suitable reflective surface that reflects all or substantially rays in the same direction.

Exemplary mirror 1009 is oriented relative to the incident beams such that actuation about the x- and y-axes enables retro-reflection of each spectral component back along its incident path. In this exemplary configuration, spectral components that are reflected back along their incident paths are re-coupled into their respective input/output fibers 1003 and 1014. The retro-reflected spectral components may pass back through 1×2 couplers 1002 and 1013, in which they are attenuated by approximately 3 dB, and are directed into detectors 1011 and 1017, respectively. In this example, the detectors are standard fiber-pigtailed InGaAs photodiodes. Other examples can use any of a variety of types of detectors including, for example, low speed or high speed, individual or array, PIN, or avalanche photodiode (APD) detectors.

Suitable components such as a digital signal processor (DSP) and associated electronics, not shown, drive mirror 1009 and read detector 1011 and 1017 output signal levels. Accordingly, by appropriate control of the mirror and measurement of the detector levels, the spectra of the WDM input signals are discerned. In particular, the tilt mirror 1009 may be first oriented about the x-axis to retro-reflect spectral components of the WDM input signal entering the bottom collimator as the mirror is scanned about the y-axis. The output signal level of detector 1011 may be measured periodically such that 2048 points are recorded during this first scan. Tilt mirror 1009 may be then oriented about the x-axis to retro-reflect spectral components of the WDM input signal entering the top collimator as the mirror is scanned about the y-axis. The output signal level of detector 1017 may be measured periodically such that 2048 points are recorded during this second scan. The points measured in the first and second scanned may then be calibrated for wavelength and optical power based on calibration factors determined by measuring known input spectra. Accordingly, the optical spectra of both WDM input signal are resolved and can be, subsequently, analyzed to determine optical parameters such as WDM channel wavelength, optical power, and OSNR.

Other embodiments are within the scope of the following claims.

What is claimed is:

1. An apparatus for spectrally filtering at least one input beam, comprising:
    a spectrally dispersive element configured to disperse spectral components of at least one input beam at respective angles in a spectral plane;
    one or more optical elements configured to change at least some of the angles of the propagation axes of the dispersed spectral components; and
    a reflective surface configured to receive a plurality of the dispersed spectral components, and to tilt to select at least one and fewer than all of the received spectral components to be directed to an output spatial mode;
    wherein the one or more optical elements are configured such that the transverse spatial extent of the input beam on the spectrally dispersive element is larger than the transverse spatial extent of the plurality of dispersed spectral components incident on the reflective surface, and the one or more optical elements are further configured to limit the total angular dispersion of the dispersed spectral components to be less than a tilt range of the reflective surface.

2. The apparatus of claim 1, wherein directing a selected spectral component to the output spatial mode comprises directing the selected spectral component back to the spectrally dispersive element along substantially the same angle in the spectral plane at which the selected spectral component was dispersed, and along a different angle in a plane perpendicular to the spectral plane from the angle at which the selected spectral component was dispersed.

3. The apparatus of claim 1, wherein the transverse spatial extent of the input beam on the spectrally dispersive element is at least about two times larger than the transverse spatial extent of the plurality of dispersed spectral components incident on the reflective surface.

4. The apparatus of claim 1, wherein the reflective surface is configured to direct the received spectral components to a reflector that reflects at least one and fewer than all of the received spectral components back to the reflective surface and back to the spectrally dispersive element to be directed to the output spatial mode.

5. The apparatus of claim 4, wherein a tilt angle of the reflective surface determines which of the received spectral components is incident on the reflector.

6. The apparatus of claim 1, wherein the reflective surface is configured to tilt to select at least one and fewer than all of the received spectral components to be directed to an output spatial mode that matches a spatial mode of a corresponding input beam.

7. The apparatus of claim 6, further comprising a first multiport optical element configured to couple light received at a first port to a second port to provide a first input beam to the spectrally dispersive element, and to couple light received at the second port in the spatial mode of the first input beam to a third port.

8. The apparatus of claim 7, further comprising a second multiport optical element configured to couple light received at a first port to a second port to provide a second input beam to the spectrally dispersive element, and to couple light received at the second port in the spatial mode of the second input beam to a third port.

9. The apparatus of claim 8, wherein the first and second multiport optical elements are configured to satisfy at least one of the following conditions:
    to provide the first and second input beams, respectively, to the spectrally dispersive element at different angles in the spectral plane; and
    to provide the first and second input beams, respectively, to different locations of the spectrally dispersive element.

10. The apparatus of claim 1, wherein the reflective surface is configured to receive dispersed spectral components from multiple input beams, and to tilt to select at least one and fewer than all of the received spectral components of a given input beam to be directed to a corresponding output spatial mode.

11. The apparatus of claim 1, wherein the spectrally dispersive element comprises a diffraction grating.

12. The apparatus of claim 1, wherein the spectrally dispersive element is fixed relative to an input beam incident on the spectrally dispersive element.

13. The apparatus of claim 1, further comprising one or more optical elements configured to expand the input beam provided to the spectrally dispersive element.

14. The apparatus of claim 1, wherein the one or more optical elements are configured to limit the total angular dispersion of the dispersed spectral components to about 80% of the tilt range of the reflective surface.

15. The apparatus of claim 1, further comprising a controller configured to provide a control signal to scan a tilt angle of the reflective surface to sequentially direct spectral components that have been dispersed at different angles back to the spectrally dispersive element.

16. The apparatus of claim 15, further comprising at least one detector configured to receive at least a portion of a spectral component that has been directed back to the spectrally dispersive element, and to provide an electrical signal proportional to the intensity of the received portion.

17. The apparatus of claim 16, wherein a first detector detects spectral components from a first input beam that has a known spectrum to provide a wavelength calibration reference, and a second detector detects spectral components of a second input beam to measure a spectrum of the second input beam that is calibrated according to the wavelength calibration reference.

18. The apparatus of claim 17, wherein a single scan of the tilt angle of the reference surface provides both the wavelength calibration reference and the measured spectrum of the second input beam.

19. The apparatus of claim 16, further comprising a splitter to direct a first portion of a spectral component to a slow-speed detector that measures one or more of wavelength, optical power, and optical signal-to-noise ratio, and to direct a second portion of the spectral component to a high-speed detector that measures one or more of bit rate, bit-error rate, and Q.

20. The apparatus of claim 16, further comprising a polarizer between the spectrally dispersive element and the detector.

21. A method for spectrally filtering at least one input beam, comprising:
dispersing spectral components of at least one input beam at respective angles in a spectral plane;
changing at least some of the angles of the propagation axes of the dispersed spectral components so that a plurality of the spectral components reflect from a single reflective surface, and so that the transverse spatial extent of the input beam on the spectrally dispersive element is larger than the transverse spatial extent of the plurality of dispersed spectral components incident on the reflective surface, and to limit the total angular dispersion of the dispersed spectral components to be less than a tilt range of the reflective surface; and
tilting the reflective surface to select at least one and fewer than all of the received spectral components to be directed to an output spatial mode.

22. The method of claim 21, wherein the transverse spatial extent of the input beam on the spectrally dispersive element is at least about two times larger than the transverse spatial extent of the plurality of dispersed spectral components incident on the reflective surface.

23. The method of claim 21, wherein tilting the reflective surface to select at least one and fewer than all of the received spectral components to be directed to an output spatial mode comprises directing the received spectral components to a reflector that reflects at least one and fewer than all of the received spectral components back to the reflective surface and back to the spectrally dispersive element to be directed to the output spatial mode.

24. The method of claim 23, wherein a tilt angle of the reflective surface determines which of the received spectral components is incident on the reflector.

* * * * *